United States Patent
Wellman et al.

(10) Patent No.: US 6,662,927 B2
(45) Date of Patent: Dec. 16, 2003

(54) STRIP INVERTER

(75) Inventors: Ronald Alan Wellman, Coldwater, OH (US); Kent Alan Stubbendieck, Wadsworth, OH (US); Mario Antonio Rago, Toronto (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 09/946,906

(22) Filed: Sep. 5, 2001

(65) Prior Publication Data

US 2003/0042111 A1 Mar. 6, 2003

(51) Int. Cl.[7] .............................................. B65G 47/24
(52) U.S. Cl. ....................................................... 198/406
(58) Field of Search ................................. 198/402, 403, 198/406; 193/45, 47, 49; 226/196.1

(56) References Cited

U.S. PATENT DOCUMENTS

| | | | | |
|---|---|---|---|---|
| 2,820,402 A | * | 1/1958 | Waenerlund | 198/403 |
| 3,370,642 A | * | 2/1968 | Meier et al. | 226/196.1 |
| 3,582,154 A | | 6/1971 | Russ, Sr. | 305/35 EB |
| 3,703,321 A | | 11/1972 | Schoonover | 305/38 |
| 3,732,917 A | * | 5/1973 | Deubel | 198/402 |
| 3,781,067 A | | 12/1973 | Dodson et al. | 305/35 |
| 4,207,052 A | | 6/1980 | Satzler | 425/394 |
| 4,343,667 A | | 8/1982 | Hollis | 156/157 |
| 4,548,663 A | | 10/1985 | Worcester | 156/159 |
| 5,066,352 A | | 11/1991 | Albers et al. | 156/265 |
| 5,536,464 A | | 7/1996 | Muramatsu | 264/254 |
| 6,227,532 B1 | * | 5/2001 | Bakoledis | 198/403 |

* cited by examiner

*Primary Examiner*—Joseph E. Valenza
(74) *Attorney, Agent, or Firm*—Richard B. O'Planick; Nancy T. Krawczyk

(57) ABSTRACT

Disclosed is an apparatus for inverting a lugged strip to a desired orientation without the necessity of manhandling the strip and potentially damaging the strip or any of the lugs. The apparatus has a semi-circular tube through which the strip travels. Within the tube, to assist the strip, is a conveyor. The conveyor is mounted on the larger diameter side of the semi-circular tube. The strip is moved from an unloader and into an opening of the inverter with the lugs. The strip makes contact with the far wall of the tube and then is forced to travel along the semi-circular path of the tube. Due to the forced curve and turning of the strip, the strip is inverted.

3 Claims, 20 Drawing Sheets

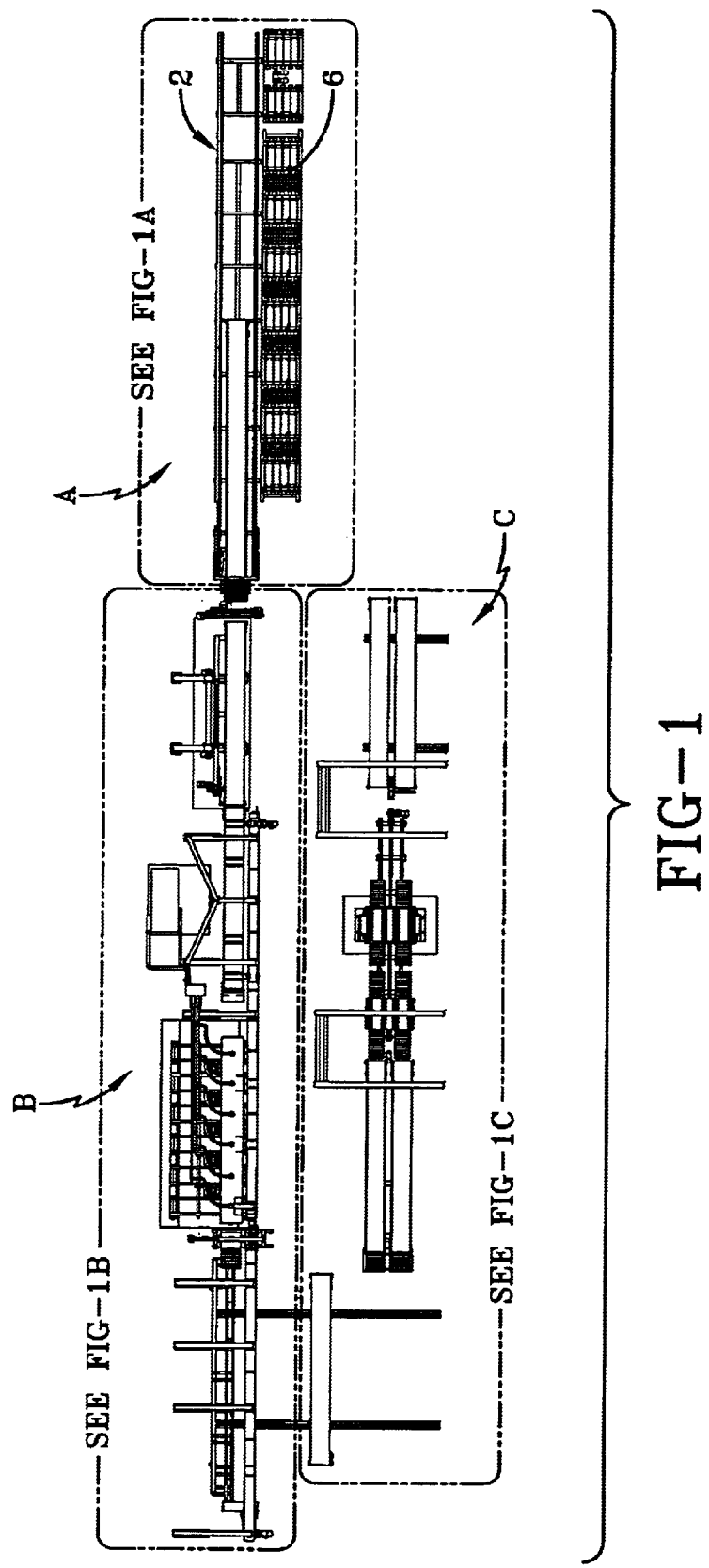

STRIP INVERTER

FIELD OF THE INVENTION

The present invention relates to a method and apparatus for manipulating a lugged strip. More specifically, the present invention is directed to a method and an apparatus for inverting a lugged strip of material.

BACKGROUND OF THE INVENTION

Earthmover machines and agricultural equipment have ground engaging means employing endless tracks driven by drive wheels. The endless track, or belt, is assembled over a plurality of wheels, at least one of which is a drive wheel, and is engaged by the drive wheel. Such track systems are increasingly more common because the tracks have greater traction in soil and cause less ground compaction than conventional pneumatic tires.

Methods for manufacturing reinforced, endless rubber track can be both expensive and time-consuming. Some methods and apparatus used for the manufacture of industrial belts may be applicable to endless vehicle tracks. However, because of the large differences in the sizes of the belts, which typically have a size expressed in inches or cm, and endless rubber track, which typically have sizes expressed in feet, a simple scale-up of belt technology is not always possible and may not yield usable rubber track. This is self evident due to the greater amount of rubber and reinforcement that must be vulcanized for tracks in comparison to belts.

In forming tracks, there are several known methods for forming endless reinforced track. U.S. Pat. Nos. 5,536,464, and 4,207,052 illustrate a few conventional methods.

In these known track forming methods, the track carcass, the various rubber layers and reinforcement means are wound on a fixed circumference drum. The circular carcass is then placed into an open "C" press for curing, wherein the first and last heat must match up to create the appearance of an endless built and cured rubber track.

As the track diameter increases the number of heats required to cure the entire track increases, increasing the likelihood of uneven cures at the match points of the heats. Additionally, for each different track size there must be a drum capable of forming a carcass of that size, either an expandable or a fixed diameter drum.

SUMMARY OF THE INVENTION

In forming the track as disclosed herein, the track is cured as a flat strip with the lugs pointing downwardly. However, to splice the strip to form an endless track, the lugs must face upwardly; thus the strip must be inverted. Disclosed is an apparatus for inverting the strip to the desired orientation without the necessity of manhandling the strip and potentially damaging the strip or any of the lugs.

The apparatus has a semi-circular tube through which the strip travels. Within the tube, to assist the strip is a conveyor. The conveyor is a preferably a passive roll conveyor along which the cured strip travels. The conveyor is mounted on the larger diameter side of the semi-circular tube.

The strip is moved from an unloader and into an opening of the inverter with the lugs. The strip makes contact with the far wall of the tube and then is forced to travel along the semi-circular path of the tube. Due to the forced curve and turning of the strip, the strip is inverted.

BRIEF DESCRIPTION OF THE DRAWINGS

The invention will be described by way of example and with reference to the accompanying drawings in which:

FIG. 1 is an overhead view of the manufacturing system;

DETAILED DESCRIPTION OF THE INVENTION

The manufacturing system has three manufacturing cells: a building cell A, a flat cure press cell B, and a splice cure press cell C, see FIG. 1. The cells A, B, C are in series with the appropriate necessary material handling of the material assembly from one cell to the next cell.

The Build Cell

The build cell A, the first cell in the manufacturing system, and its components are illustrated in FIGS. 1A, 2A, and 3–10. The build cell A has a build table 2, a build shuttle 4 which travels the length of the build table 2, and at least one load cartridge 6.

Figure 1A:
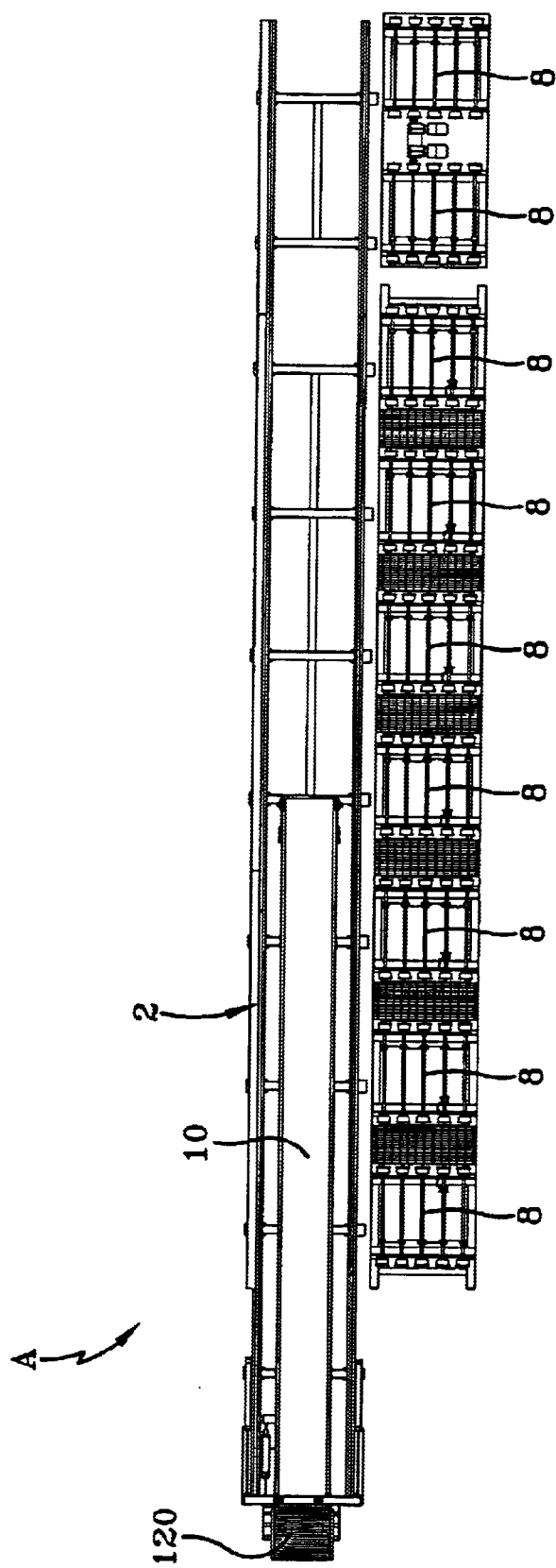
FIG. 1A is an overhead view of the building cell.
Figure 1B:
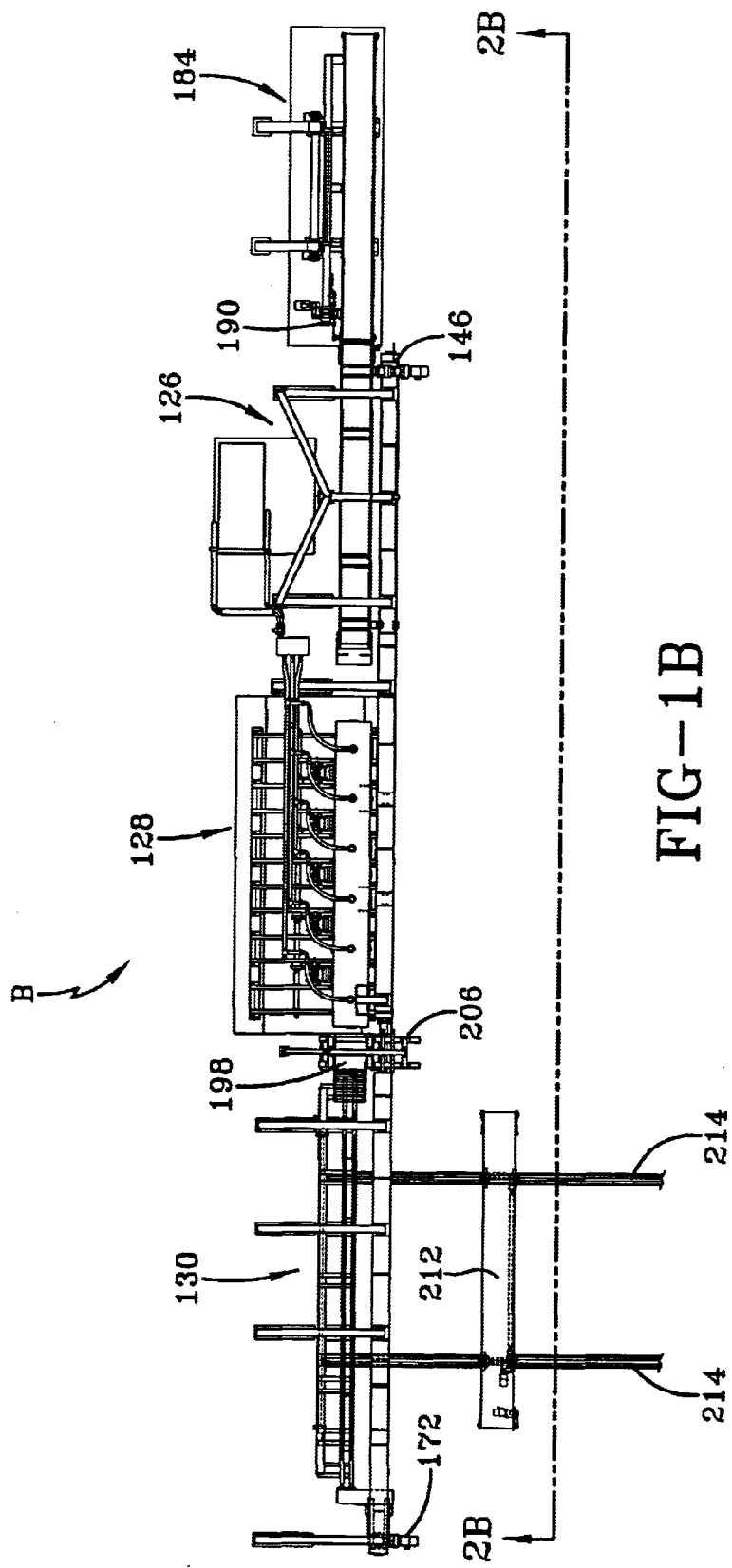
FIG. 1B is an overhead view of the press cell.

As seen in FIG. 1A, the build table 2 (illustrated without the build shuttle 4) is located adjacent a plurality of cartridge stations 8. The build table 2 has a length at least equivalent to the circumferential length of the largest belt that can be built in the manufacturing system. The table 2 has a powered conveyor belt 10. The underside of the conveyor belt 10 is preferably ribbed to provide for tracking of the belt 10. The conveyor belt 10 is powered by a motor 12 at one end of the build table 2. The table 2 is mounted on a plurality of load cells (not illustrated). The load cells measure the total weight of material laid upon the build table 2. Such information is necessary when the track carcass is to be built to weight specifications, or when the carcass weight must be known. Cartridge stations 8 are distanced from each other along the side of the build table 2.

Figure 2A:
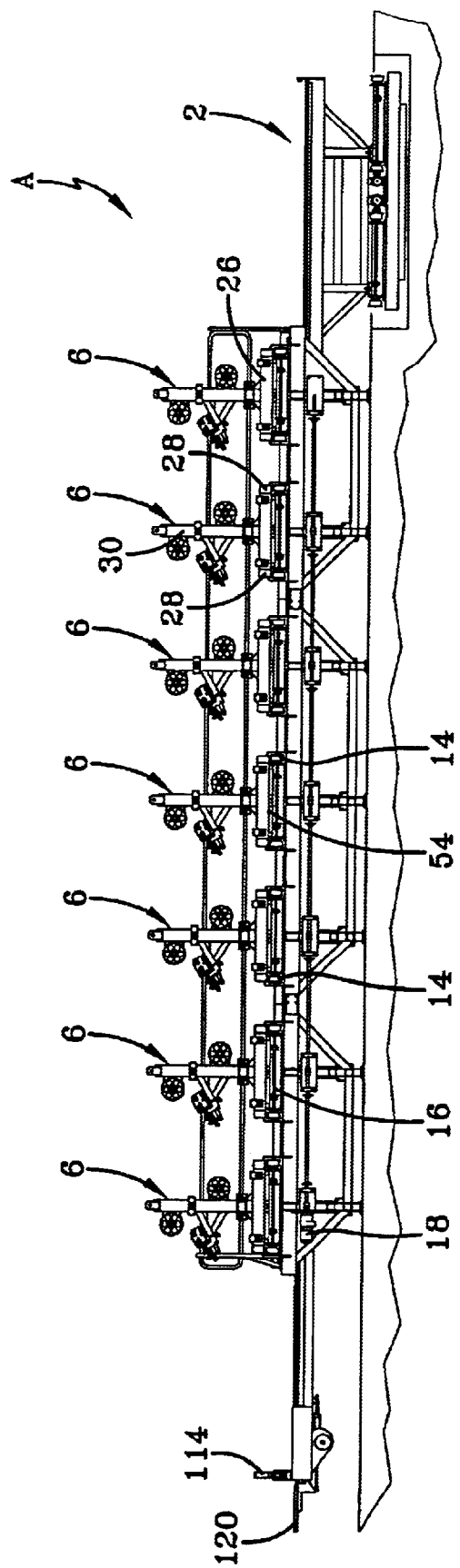
FIG. 2A is a side view of the building cell.

FIG. 2a illustrates a side view of the build cell A from the side facing the cartridge stations 8 and with empty load cartridges 6. Along the base of each cartridge station 8 are pairs of drive wheels 14. The drive wheels 14 in each pair are connected by an axle 16. When the cartridge 6 is in its cartridge station 8, the cartridge 6 rest on the drive wheels 14. The number and type of wheels 14 must be sufficient to support the weight of the fully loaded cartridge 6. The pairs of wheels 14 are connected to a clutch at each cartridge station 8, synchronizing the speed and movement of the wheels 14. The clutches at each station 8 are connected to a motor 18.

Figure 4:
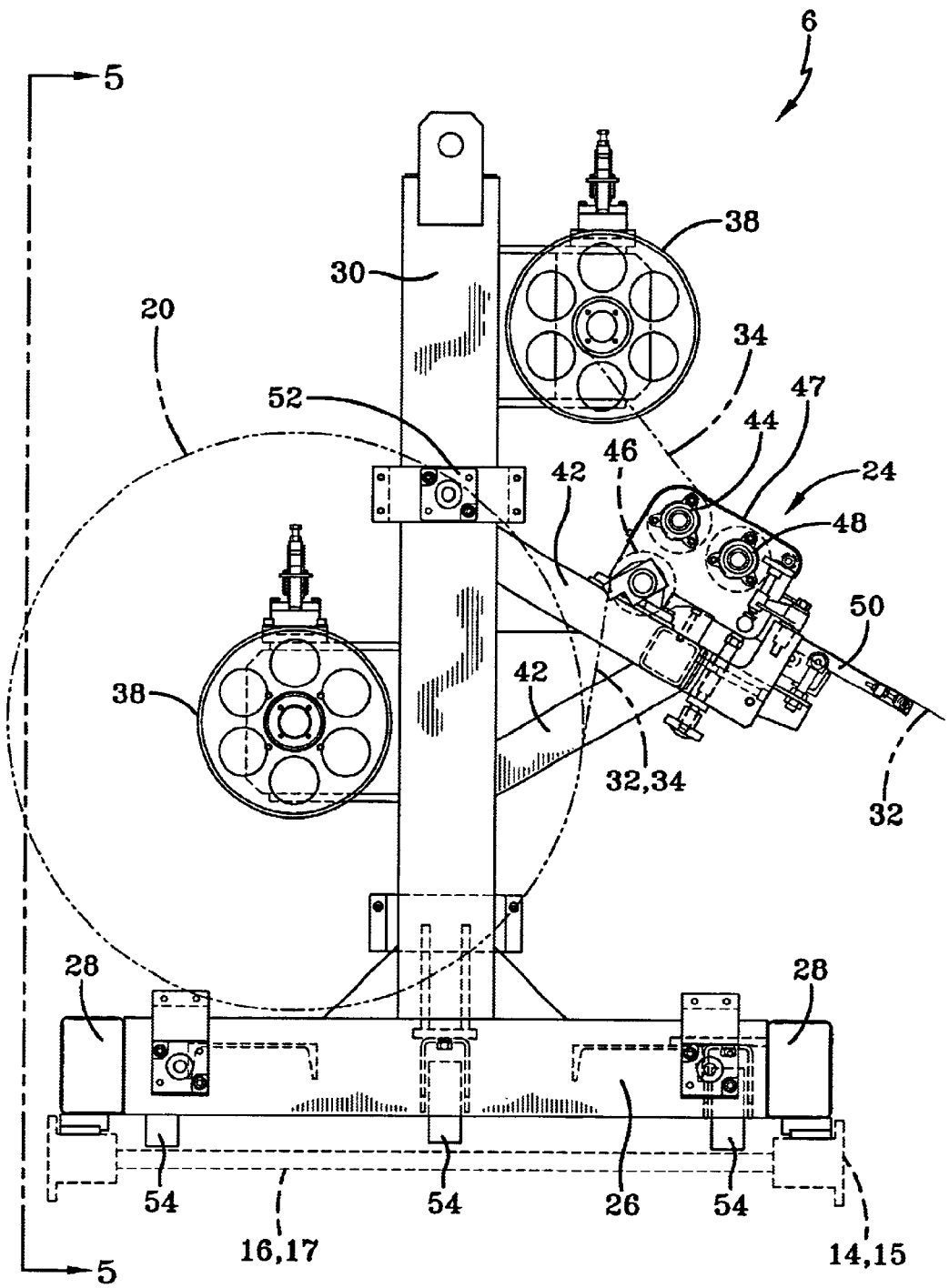
FIG. 4 is side view of a material cartridge.
Figure 5:
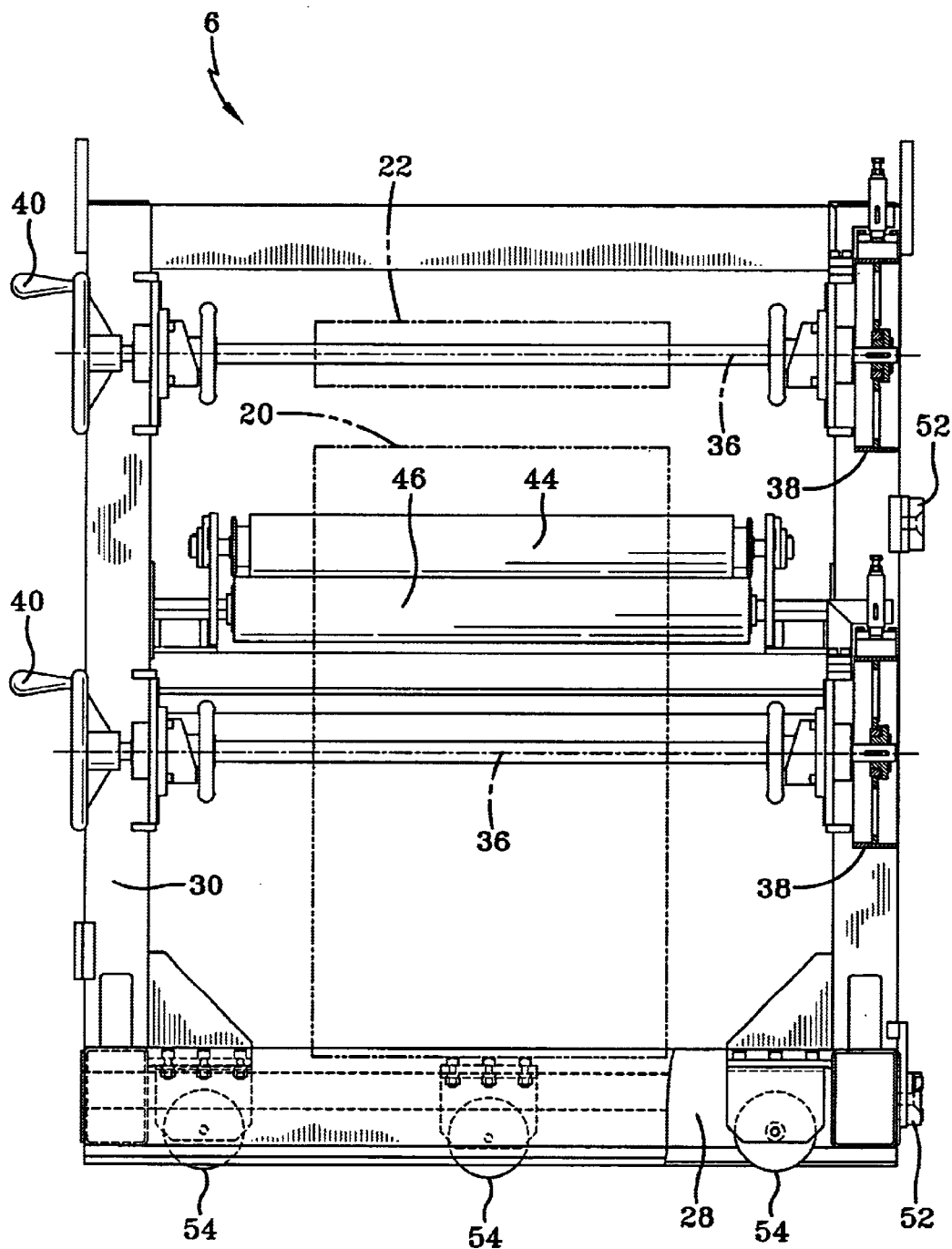
FIG. 5 is the material cartridge along line 5—5 of FIG. 4.
Figure 6:
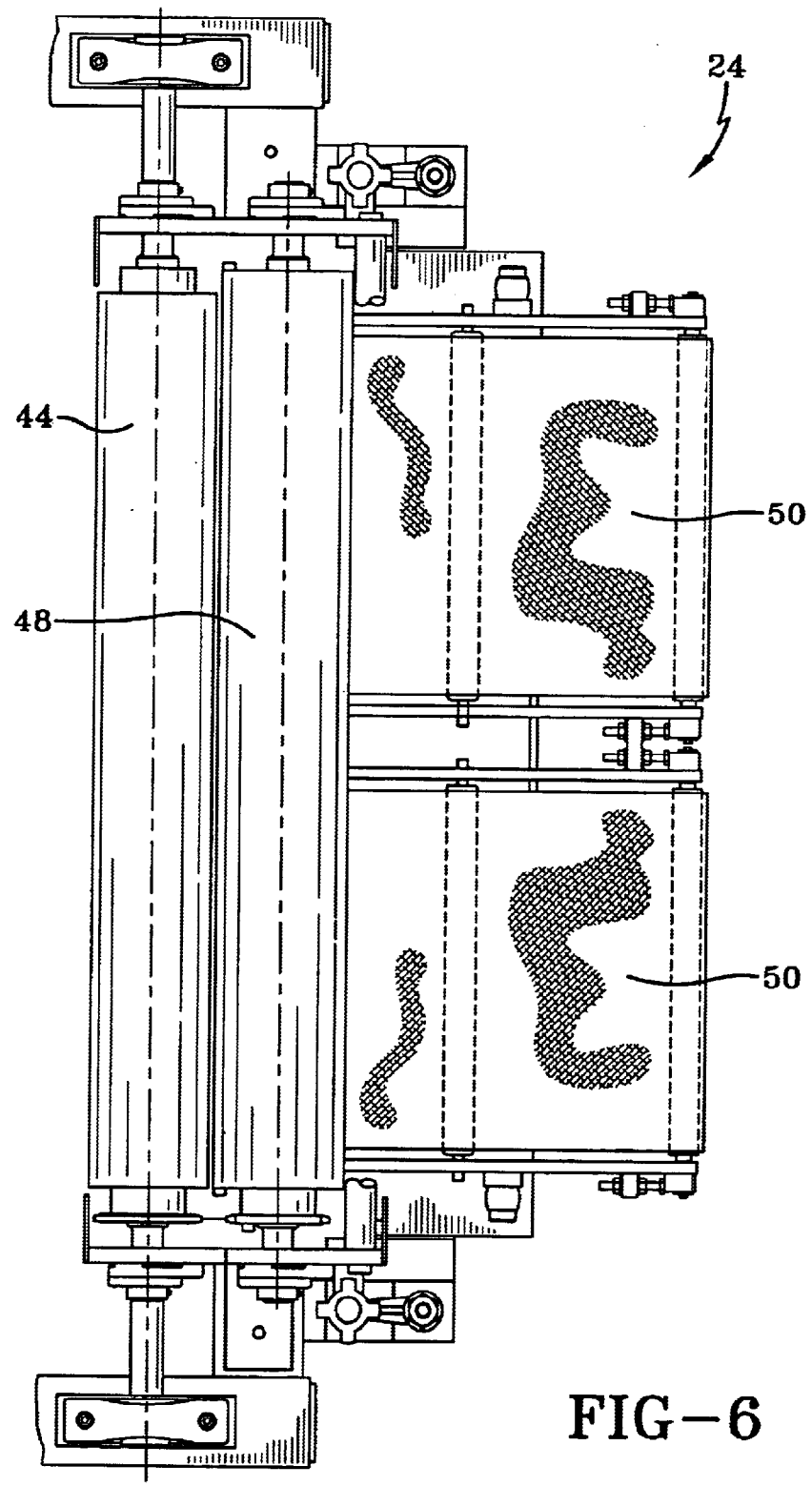
FIG. 6 is an overhead view of the stock left-off mechanism.
Figure 7:
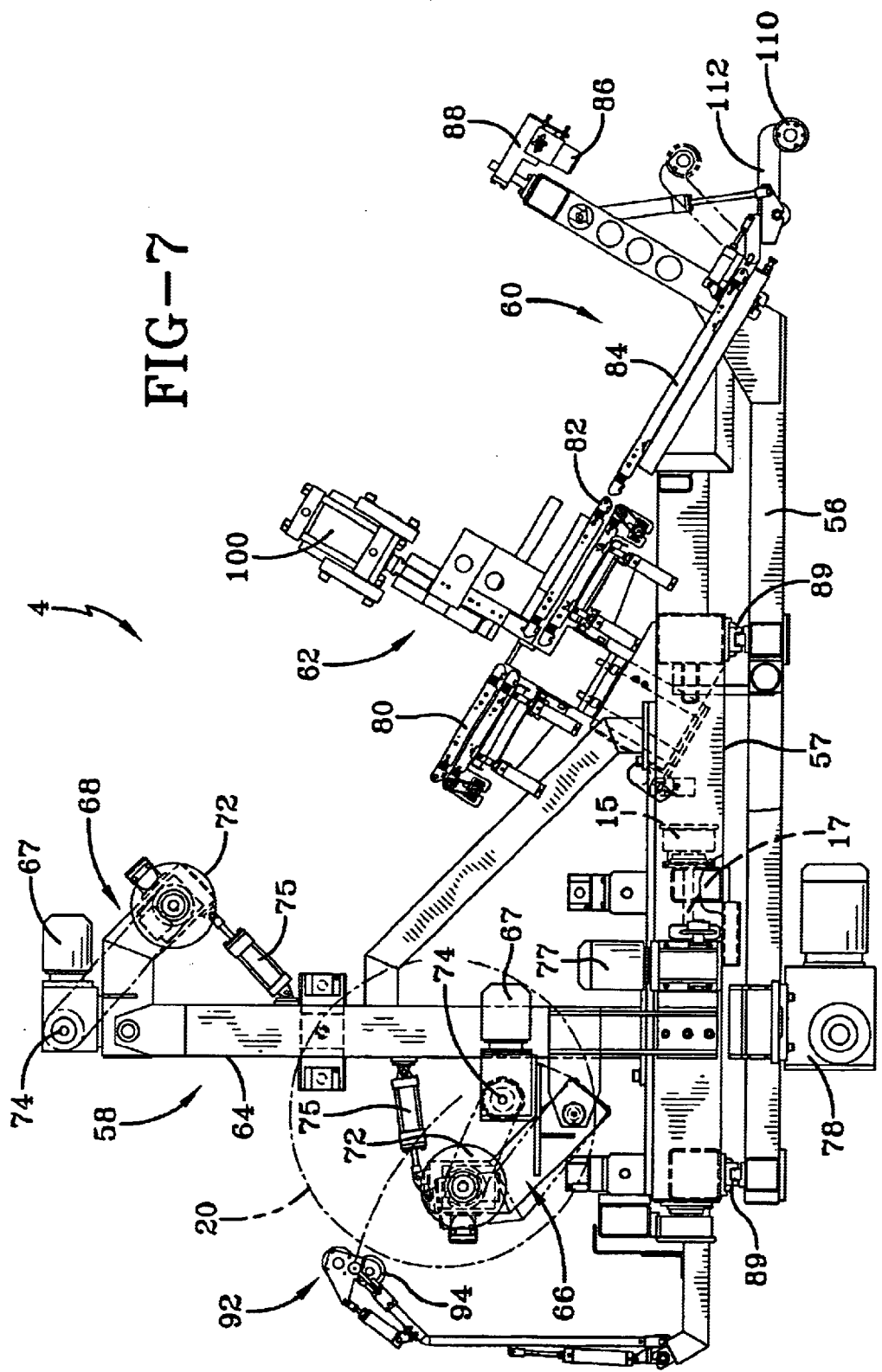
FIG. 7 is a side view of the build shuttle.
Figure 8:
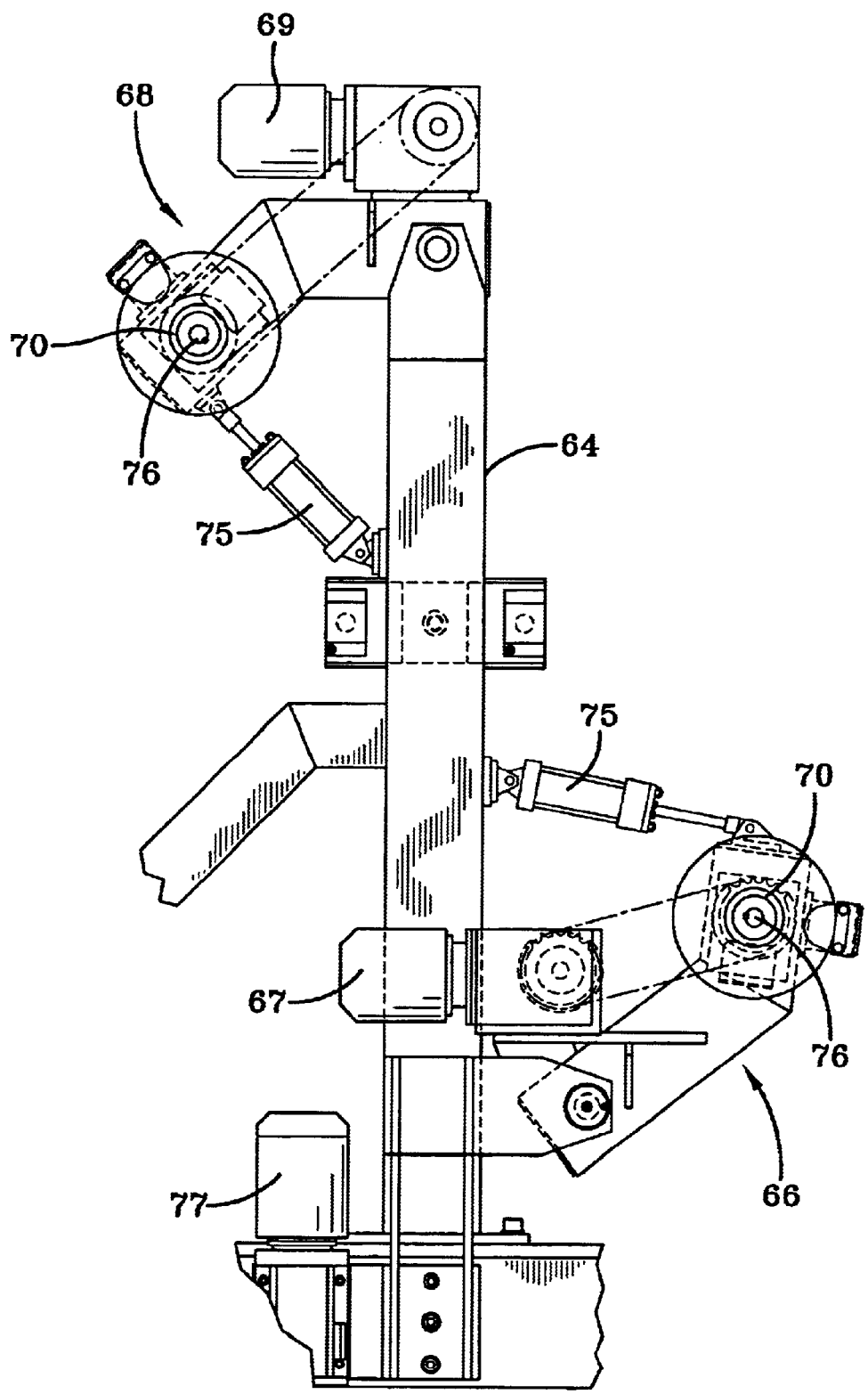
FIG. 8 is the drive column of the build shuttle.
Figure 9:
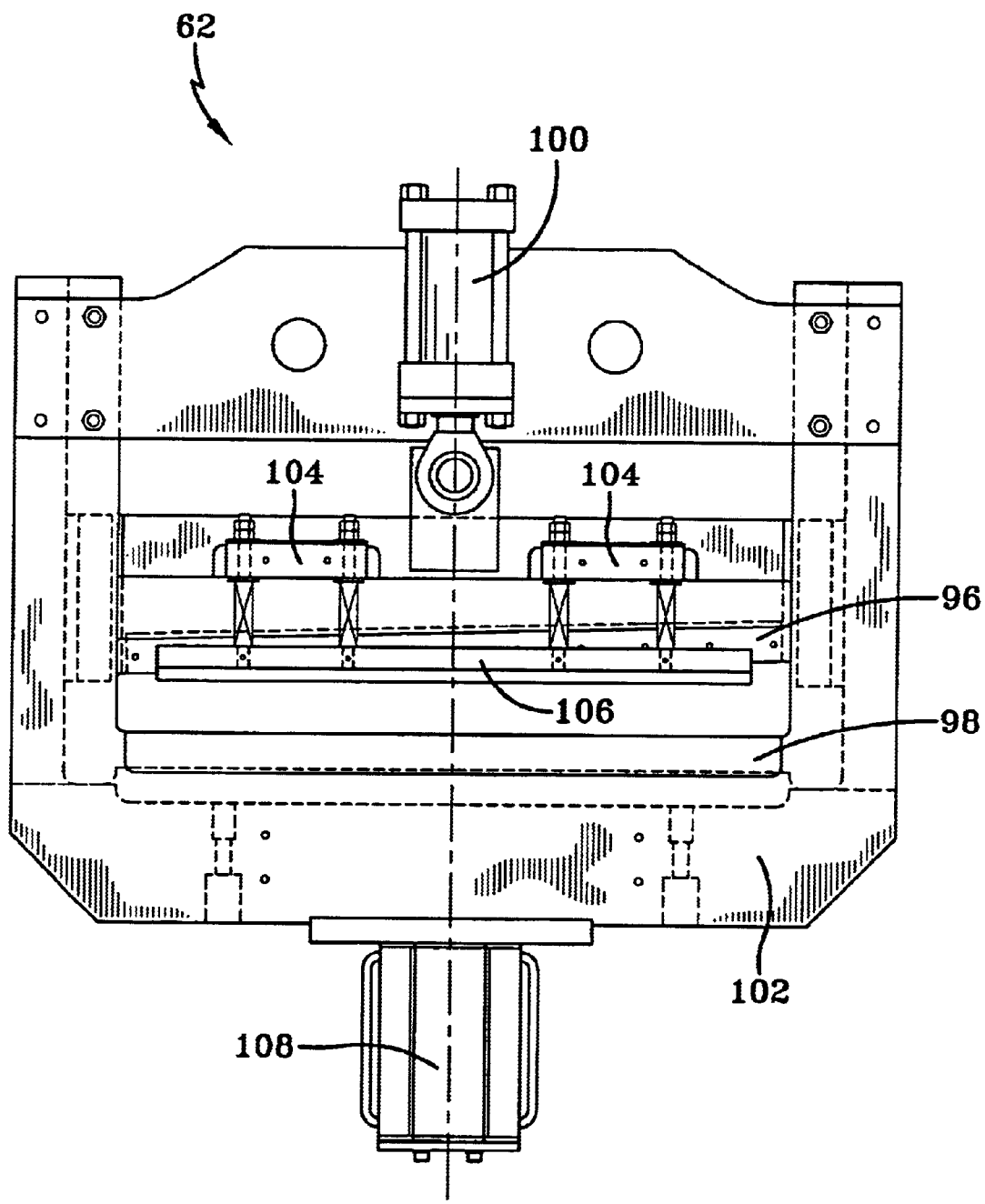
FIG. 9 is the shear assembly.

Each load cartridge 6 has an open frame structure, with means to mount both a stock material roll 20 and a separator sheet take-up roll 22, and a stock let-off assembly 24, see FIGS. 4–6. The rectangular cartridge base has two side support beams 26 and two width support beams 28. Side support beams 30 extend upwardly from the side base beams 26. On a first side of the side support beams 30 are means to mount the stock material roll 20. The stock material 32 may be rubber sheet, calendered cord, or calendered wire. The types of rubber, cord, and wire are of the type conventionally used in the manufacture of the carcass of rubber tracks.

On the opposing side of the side support beam 30, and vertically offset from where the stock material roll 20 is to be mounted, are means to mount the separator sheet take-up roll 22. The separator sheet 34 is originally between adjacent spiral layers of the stock material 32. The means for mounting the stock material roll and the take-up roll allow for easy rotation, removal, and replacement of the rolls 20, 22. For both the stock material roll 20 and the separator sheet take-up roll 22, shafts 36 extend between the side support beams 30. At the side of the cartridge 6 closest to the build table 2, shafts 36 extend and terminate in fly wheels 38. At the opposing end of each shaft 36, a hand wheel 40 may be provided to assist the builder in loading and unloading the cartridge 6.

The separator sheet 34 is separated from the stock material 32 at the stock let-off assembly 24. The stock let-off assembly 24 is located beneath the take-up roll 22, and mounted on angular support frames 42 extending from each side support beam 30. The stock let-off assembly 24 has a top roll 44, a bottom roll 46, a side feed roll 48, and a feed conveyor 50.

The stock material 32 and the separator sheet 34 pass between the top and bottom rolls 44, 46 and are separated from each other at this point in the stock let-off assembly 24. The separator sheet 34 passes between the top roll 44 and the side feed roll 48 and is wound onto the take up roll 22. The stock material 32 passes beneath the feed roll 48 and onto the feed conveyor 50. The rolls 44, 46, and 48 are preferably synchronized by means of a drive belt passing about drive sprockets mounted at one end of the rolls 44, 46, 48. Side plates 47 may be mounted at the ends of all three rolls 44, 46, 48.

The feed conveyor 50 may be either a roll conveyor or an endless belt conveyor. The selection of the type of conveyor is best determined by the properties of the stock material loaded in the cartridge 6. Typically, if the stock material 32 is rubber sheet, a belt conveyor operates better, and if the stock material 32 is calendered wire or cord, then a roll conveyor may operate better. In FIG. 6, the feed conveyor is a split belt conveyor.

When cartridges 6 are in the cartridge station 8, the width base beams 28 of the cartridge 6 rest on the drive wheels 14 and the cartridge 6 is secured in the station 8 by locks 52. The locks 52 are located on the side base beam closest to the power end of the cartridge station 8. To assist in moving the cartridge 6, or to wheel the cartridge 6 out of the cell A, wheels 54 are mounted along the underside of the carriage 6. The wheels 54, when the cartridge 6 is in its station 8, are not employed and are actually suspended in the air.

Mounted on the build table 2, and capable of traveling the length of the build table 2, is the build shuttle 4. The build shuttle 4 has an extending base frame 56 and mounted on the base frame is a second frame 57 upon which is a power dispenser unit 58, build conveyor 60, and a shear assembly 62, see FIG. 7. The build shuttle 4 may also have a centering system to ensure that each ply of stock material 32 is centered as it is laid on the build table 2 and the shuttle 4 may also have a stitching system that rolls the laid ply unto the previously laid plies.

The power dispenser unit 58 is located at one end of the base frame 56. The power dispenser unit 58 has a drive column 64 perpendicular to the base frame 56. At the lower end of drive column 64 is a lower drive arm 66. Mounted on the lower drive arm 66 is a drive wheel 70, an associated brake 72, and clutch 74. The drive wheel 70 is mounted on the inner side of the lower drive arm 66, facing the cartridge stations 8, see FIG. 8 which illustrates the inside view of the drive column 56. The associated brake 72 and clutch 74 are mounted on the outer side of the lower drive arm 66 and are connected to the drive wheel 70 through the drive wheel shaft 76. A motor 67 adjacent to the drive arm 66 powers the mechanisms of the lower drive arm 66. A pneumatic cylinder 75 is mounted to the column 64 and to the drive arm 66. When activated, the pneumatic cylinder 75 moves the drive arm 66 to initiate or terminate contact between the drive wheel 70 and the fly wheel 38 associated with the stock material roll 20.

Mounted at the top of the drive column 64, and on the opposite side of the column 64 from the lower drive arm 66, is the upper drive arm 68. Mounted on the upper drive arm 68 is a drive wheel 70 and an associated brake 72 and clutch 74. The drive wheel 70 is mounted on the inside of the upper drive arm 68. The associated brake 72 and clutch 74 are mounted on the outer side of the upper drive arm 68 and are connected to the drive wheel 70 through the drive wheel shaft 76, see FIG. 8. The motor 69 powers the mechanisms of the upper drive arm 68. A pneumatic cylinder 75 is mounted to the column 64 and to the drive arm 68. When activated, the pneumatic cylinder 75 moves the drive arm 68 to initiate or terminate contact between the drive wheel 70 and the fly wheel 38 associated with the take up roll 22.

Extending across the frame 57 of the build shuttle 4, at the power dispenser unit end of the shuttle 4, are pairs of drive wheels 15. The drive wheels 15 in each pair are connected by an axle 17. The wheels 15 of each pair are equidistant from the drive column 64 and are the same space apart as the drive wheels 14 in each cartridge station 8. The motor 77 adjacent to the drive column 64 powers the pairs of drive wheels 15.

Adjacent to the power dispenser unit 58 is the build conveyor 60. The build conveyor 60 is at an inclined angle relative to the shuttle base frame 56. The build conveyor 60 transports the stock material 32 along its length and onto the belt 10 of the build table 2. The build conveyor 60 may be constructed in multiple ways. The conveyor 60 may be a single belt conveyor, a plurality of small belt conveyors, or several adjacent belt conveyors, similar to feed conveyor 50. The conveyor 60 may also be a ball conveyor, a roll conveyor or a combination of ball and roll conveyors. As with the feed conveyor 50 on the load cartridge 6, the physical properties of the stock material 32 will determine which type of conveyor is best suited for use as the build-up conveyor 60.

In the illustrated build conveyor 60, there are three sets 80, 82, 84 of adjacent belt conveyors. The uppermost set 80 extends prior to the shear assembly 62, the middle set 82 extends from the exit point of the shear assembly 62 to just beyond the shear assembly 62, and the lowermost set 84 extends from the middle set 82 to a point adjacent to the surface of the build table conveyor belt 10.

Mounted at the end of the build conveyor 60 may be a component of a centering system. A digital or photoelectric means, such as the illustrated camera 86 is mounted onto a bracket 88 over the top of the build conveyor 60 and provides information regarding the width of the stock material 32. The camera 86 provides feedback within the system to ensure that the stock material 32 being laid upon the build table conveyor belt 10 is aligned and centered with previously laid plies of stock material 32. To adjust the alignment of the material 32 being laid down upon the build table conveyor belt 10, if a misalignment is detected, at a minimum, the lowermost portion 84 of the build conveyor 60 is capable of side-to-side movement to correct any misalignment. For this reason, it is advantageous to have the lowermost portion of the build conveyor distinct from the remainder of the build conveyor 60. As an alternative, the entire build conveyor 60, in conjunction with the shear assembly 62, and the power dispenser unit 58 may be capable of transverse, or side-to-side, movement. To achieve this, as noted, the power dispenser unit 58, the build conveyor 60, and the shear assembly 62 are mounted onto the frame 57. Frame 57 is mounted onto frame 56 via a set of liner slides 89, permitting the frame 57 and all of the components mounted thereon to laterally move and adjust the placement of the stock material 32 upon the table 2. The centering system is mounted directly onto the side frame 56, so that the system does not move.

Other sensing means may be located in various locations on the build shuttle 4 to assist in the proper placement of the stock material 32 and the proper build of a track carcass 90. Such other sensing means may also assist in providing information regarding the length of the material 32 being fed through the build shuttle 4 and onto the build table conveyor belt 10 to assist in building the track carcass 90 to the correct specification length. One such device is the encoder 92 located at the stock material roll 20. The encoder 92 has a roller 94 that contacts the stock material roll 20, tracking the amount of material 32, and liner 34, being fed out by the shuttle assembly 4. The encoder 92 may be located at any other location where it can contact at least either the stock material 32 or the liner 34 as it is feed off the roll 20. Additional sensing means can also include cameras located at the lowermost end of the conveyor 84 to determine when material 32 is laid upon the belt 10.

The shear assembly 62 is mounted over the build conveyor 60, and prior to the middle conveyor section 82, and shears the stock material 32 being laid on the build table conveyor belt 10. The shear assembly is shown in more detail in FIG. 9. The shear assembly 62 has a top knife blade 96 and a bottom knife blade 98. The top blade 96 is attached to a hydraulic cylinder 100 that is guided by the shear assembly frame 102. The bottom blade 98 is fixedly attached to the shear assembly frame 102. To prevent the blades 96, 98 from spreading apart when shearing the stock material 32, the shear assembly frame 102 is strengthened to stabilize the frame 102.

Sets of compression springs 104 are located adjacent the blades 96, 98 and are connected to a hold down bar 106. When stock material 32 is sheared, the springs are activated to force the hold down bar 106 against the stock material during the shearing.

The shear assembly 62 rotates the assembly +/−30° from the transverse direction. The shear assembly 62 is on a central post 108 that permits it to rotate. The conveyors 80, 82 drop down for clearance when the shear assembly 62 is activated and also when the shear assembly 62 rotates.

Mounted at the end of the shuttle base frame 56 is an optional stitching system including a stitching roll 110. The stitching roll 110 is mounted pivotally at the end of the shuttle base frame 56. When not in use during traveling of the shuttle 4 along the length of the build table conveyor belt 10, the arms 112 holding the stitching roll 110 are maintained at a position above the build table conveyor belt 10.

Figure 10:
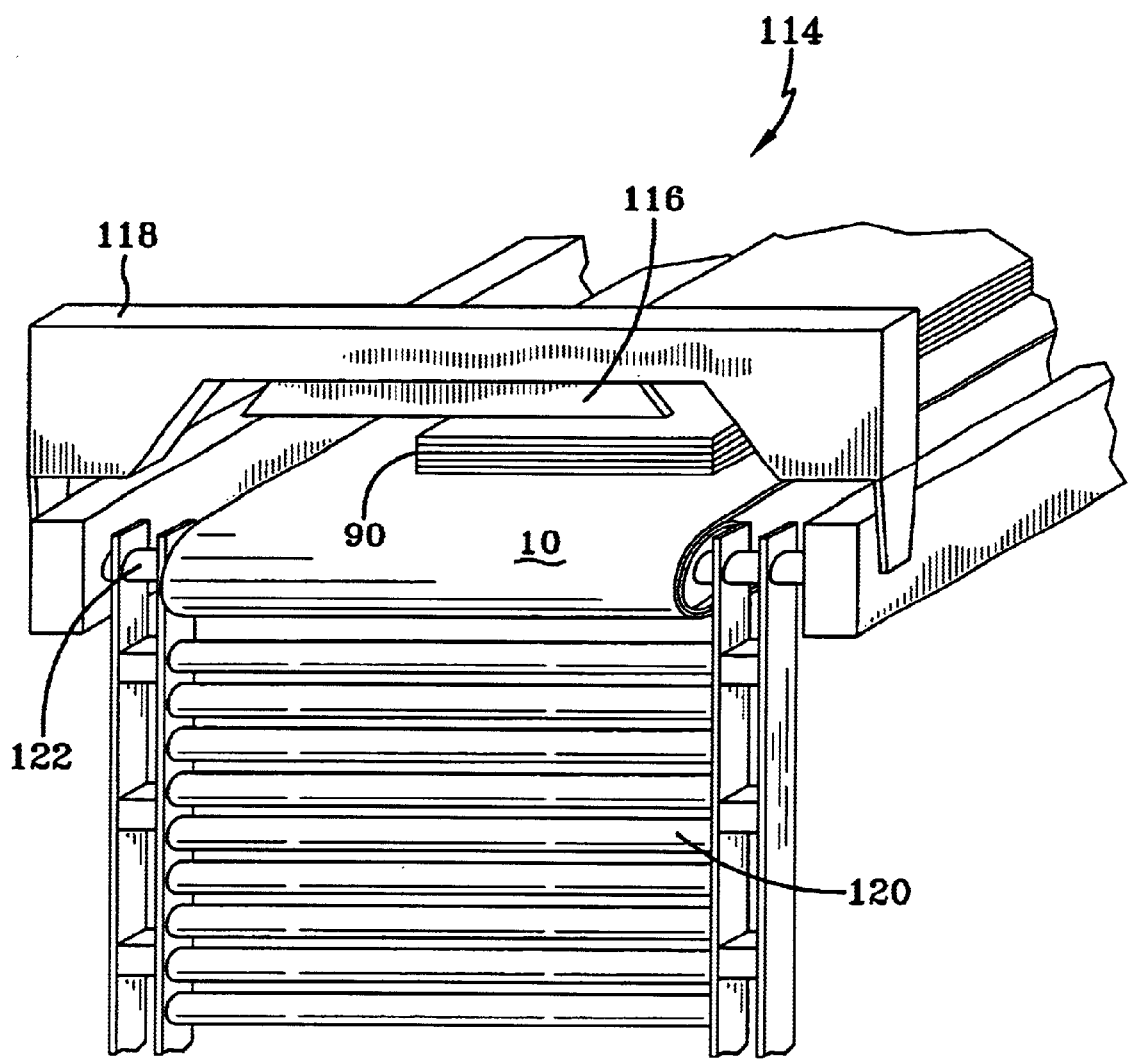
FIG. 10 is the hold down unit at the end of the build table.
Figure 11:
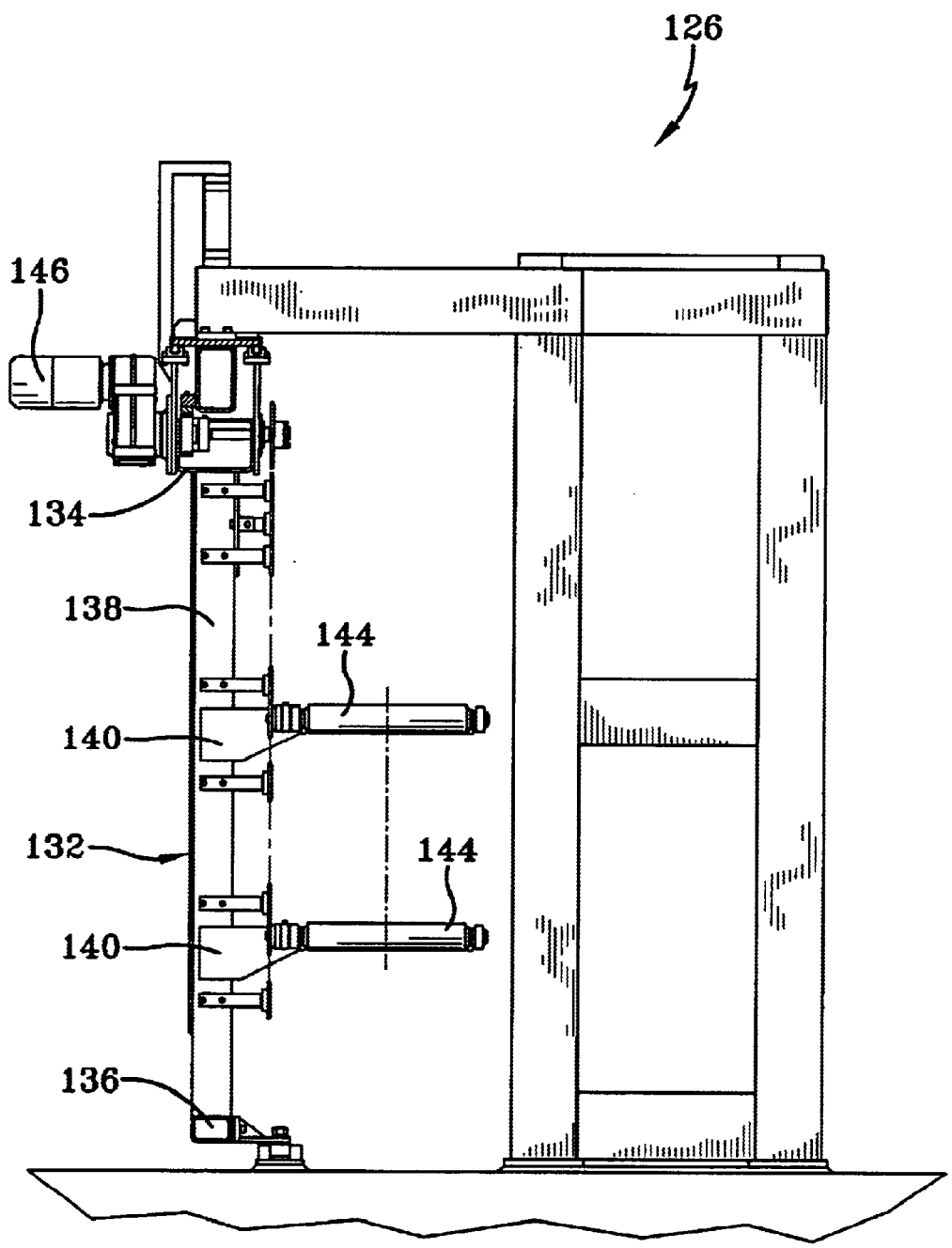
FIG. 11 is the loader assembly along line 11—11 in FIG. 2B.

To additionally assist in laying up the different plies of the track carcass 90, a hold-down unit 114 may be located at the end of the build table 2, see FIG. 10. The hold-down unit 114 travels along the end of the build table 2. The unit 114 has a center hold-down bar 116 mounted underneath a u-shaped frame 118. Other types of hold down units may be employed other than the illustrated configuration.

To assist in moving the built-up carcass 90 off the table 2, a swing conveyor 120 may be provided at the end of the build table 2. Typically, the swing conveyor 120 is at a position perpendicular to the build table 2. The swing conveyor 120 is mounted so as to pivot about a point 122 coincident with the end roll about which the build table conveyor belt 10 turns. After pivoting, the swing conveyor 120 is parallel to the build table 2. The swing conveyor 120 is illustrated as a roll conveyor but may be a belt conveyor or a ball conveyor.

Operation of the Build Cell

Figure 3:
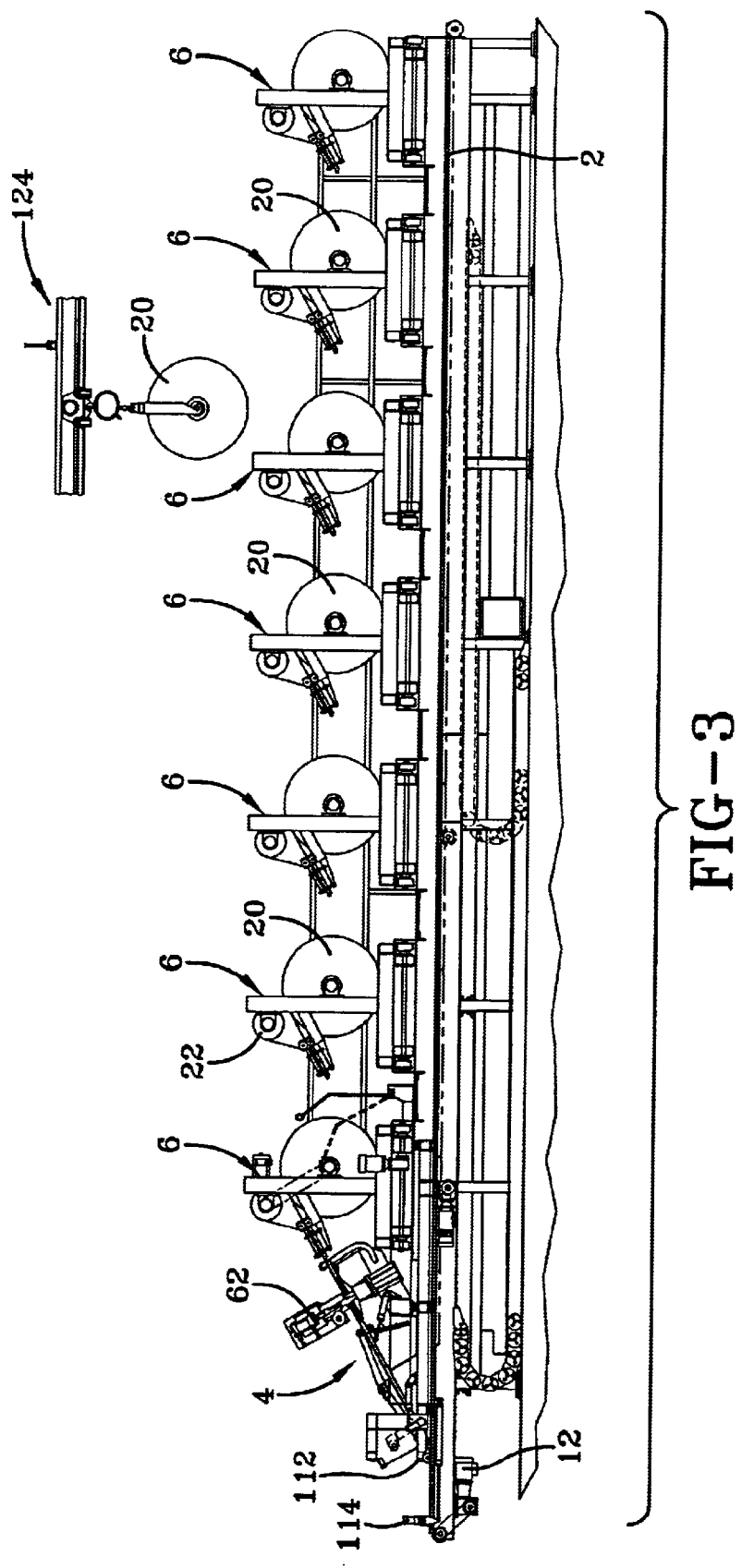
FIG. 3 is a side view of the building cell facing the build table.

A load cartridge 6 is loaded with a roll 20 of stock material 32 and liner 34. The stock material 32 in each cartridge 6 may be distinct; however, if a single type of stock material 32 is to be repetitively used in building the track carcass 90, than multiple cartridges 6 may be loaded with the same stock material 32. As seen in FIG. 3, new rolls 20 may be loaded into the cartridges 6 by means of an overhead transport system 124.

To begin building a track carcass 90, the build shuttle 4 travels the length of the build table 2 until it is directly adjacent a load cartridge 6 loaded with the appropriate stock material 32. The build shuttle 4 aligns itself with the load cartridge 6, aligning the pairs of drive wheels 15 on the build shuttle 4 with the drive wheels 14 in the cartridge station 8. Once the build shuttle 4 and the cartridge station 8 are aligned, the locks 52 maintaining the cartridge 6 in the cartridge station 8 are released, the motor 18 associated with the station is activated, the station clutch is disengaged, and the pairs of drive wheels 14 begin to rotate in the direction of the build shuttle 4. Simultaneously, the motor 77 on the build shuttle 4 located near the drive column 64 of the power dispenser 58 is activated and the drive wheels 15 in the build shuttle 4 begin to rotate in a direction towards the drive column 64.

The drive wheels 14 in the cartridge station 8 drive the load cartridge 6 out of the cartridge station 8 and the drive wheels 15 in the build shuttle 4 pull the load cartridge 6 onto the build shuttle 4. Once the cartridge 6 is on the build shuttle 4, locks secure the cartridge 6 onto the build shuttle 4 and the cartridge station motor 18 in the cartridge station 8 disengages. The build shuttle 4 then travels to the forward end of the build table 2 to begin dispensing the stock material 32.

When the load cartridge 6 is on the build shuttle 4, the pneumatics 75 are activated and the lower drive arm 66 moves so that the drive wheel 70 contacts the flywheel 38 at the end of the shaft 36 upon which is mounted the stock material roll 20, and the upper drive arm 68 moves so that the drive wheel 70 on the upper drive arm 68 contacts the flywheel 38 at the end of the shaft 36 upon which is mounted the take-up roll 22. The forward end of the feed conveyor 50 is aligned with the uppermost edge of the build conveyor 80.

The drive wheels 70 on the drive arms 66, 68 cause the rolls 20 and 22 to rotate and the pulling action of the rollers 44, 48, acting as nip rollers, in the feed conveyor 50 cause the stock material 32 to be fed onto the conveyor 50 and onto the build conveyor 60. As the stock material 32 is fed onto the build table conveyor belt 10, the build shuttle 4 moves along the length of the build table 2. Simultaneously when the build shuttle 4 begins moving down the table 2, the hold down unit 114 travels to the end of the stock material 32 on the build table 2 and the hold-down bar 116 drops down and retains the end of the stock material 32 in place on the table 2.

After the needed length of stock material 32 has been feed from the load cartridge 6, the shear assembly 62 shears the stock material 32 and build shuttle 4 continues to move back along the build table 2 to lay the remainder of the cut ply onto the table 2. Once the entire length of the spliced ply has been laid on the table 2, if the next ply of material 32 to be laid down is not loaded on the cartridge 6 currently on the build shuttle 4, the build shuttle 4 returns to the cartridge station 8 from which it removed the load cartridge 6. The operation which transferred the cartridge 6 onto the build shuttle 4 is reversed and the cartridge 6 is returned to the cartridge station 10. That is, the drive wheels 15 in the build shuttle 4 begin to rotate in the direction of the cartridge station 8, and the drive wheels 14 in the cartridge station 8 begin to rotate in the same direction, driving the load cartridge 6 off the build shuttle 4 and into the cartridge station 8. The shuttle 4 then moves to a location adjacent another cartridge station 8 to obtain a different load cartridge 6.

If the next ply to be laid down is the same stock material 32 that is in the currently loaded cartridge 6, the shuttle 4 may simply return to the front of the build table 2. In either situation, the build shuttle 4 is returned to the front of the build table 2 with a load cartridge 6 mounted thereon.

As the build shuttle 4 lays the stock material 32 down upon the build table conveyor belt 10, the stitching roll 110 may be down and stitching the ply as the shuttle 4 dispenses the stock material 32. Alternatively, as the shuttle 4 returns to the front of the build table 2, the stitching arms 112 drop down and the stitching roll 110 travels along the length of the laid down ply. As the shuttle 4 approaches the front of the build table 2, the hold-down bar 116 raises and the hold-down unit 114 returns to the end of the build table 2. Once the hold-down unit 114 is returned to the end of the table 2, the build shuttle 4 can lay down the next ply of stock material 32 on top of the previously laid ply.

After the plies of the track carcass 90 have been laid in accordance with the build specification, the uncured carcass structure 90 is removed from the build table 2. The conveyor belt motor 12 is engaged and as the conveyor belt 10 travels in the direction of the flat cure press cell B, the track carcass 90 is transferred off of the build table 2. To assist in moving the carcass 90 from the build table 2 to the flat cure press cell B, the swing conveyor 120, having a length long enough to complete the gap from the end of the build table 2 to the cure cell B, swings to a position parallel to the build table 2. Alternatively, a moveable table-like conveyor, with a height equivalent to the build table 2, may be positioned between the build table 2 and the flat cure press cell B to complete the gap between the build cell A and the flat cure press cell B.

The Flat Cure Press Cell

The flat cure press cell B, the second cell in the manufacturing system, and its components are illustrated in FIGS. 1B, 2B, 11–13. The flat cure press cell B has a carcass loading system 126, a press 128, and a belt unloader 130.

The carcass loading system 126 is a side supported cantilevered fixture 132 located between the press 128 and the build cell A. The side supported cantilevered fixture 132 has a top rail 134, a bottom rail 136, vertical support rails 138, and horizontal support rails 140. The side supported cantilevered fixture 132 is mounted on an overhead rail system 142 which runs along the length of the flat cure press cell B. The overhead rail system 142 has a length at least equivalent to the carcass loading system 126, the press 128, and the belt unloader 130. The horizontal support rails 140 support at least one power conveyor belt 144, preferably two belts 144. The motor 146 that drives the carcass loading system 126 is located on the top rail 134. A timing belt connects drive pulleys located at one end of the conveyor belts 144 and the motor 146 to synchronize the movement of the belts 144 with the movement of the fixture 132 along the overhead rail system 142. Alternatively, a feed-back control system can be used to synchronize the movement of the belts 144 and the fixture 132.

The flat cure press cell B has a double daylight open C frame style press 128 to cure the unvulcanized carcass 90 and unvulcanized lugs to form a flat vulcanized lugged strip 152. The press 128, best illustrated in FIG. 2B, has an open C-frame structure. The press 128 has a top platen 154, a center platen 156, and a bottom platen 158 so as to cure two tracks at the same time; a first track in the top daylight position 160 and a second track in the bottom daylight position 162. The top platen 154 is secured to the top of the c-frame structure of the press 128. Underneath the bottom platen 158 are hydraulic cylinder rams 164 to facilitate in both moving the bottom platen 158 and providing the necessary ram force to operate the press 128. The center platen 156 is on a counterbalance mechanism that consists of cylinders to help move it up and down.

The platens 158, 156 form the bottom daylight position 162, and the platens 154, 156 form the top daylight position 160. The bottom platens 156, 158 of each daylight position 160, 162 have segmented molds aligned next to each other with steam as the heating source. Alternatively, the molds may be made by any other conventional mold fabrication process. Also, the molds may be heated by other conventional heating means, including, but not limited to, electricity. The molds have cavities shaped to correspond to a desired lug configuration of the final track. Unvulcanized lugs are loaded into the cavities before an unvulcanized carcass 90 is loaded into the press 128. However, if the lugs to be formed are shallow, it may not be necessary to load additional vulcanizable material into the molds. The platens 154, 156 forming the top platen of each daylight position 160, 162, may be provided with tooling having a tread pattern to form a tread on the final track.

The endmost mold cavity at each end of the press 128 is cooled with water to maintain a reduced cavity temperature relative to the other cavities so that the endmost lugs adhere to the carcass 90 but remain uncured. Depending upon the splicing configuration, additional endmost cavities may also be cooled with water.

Figure 2B:
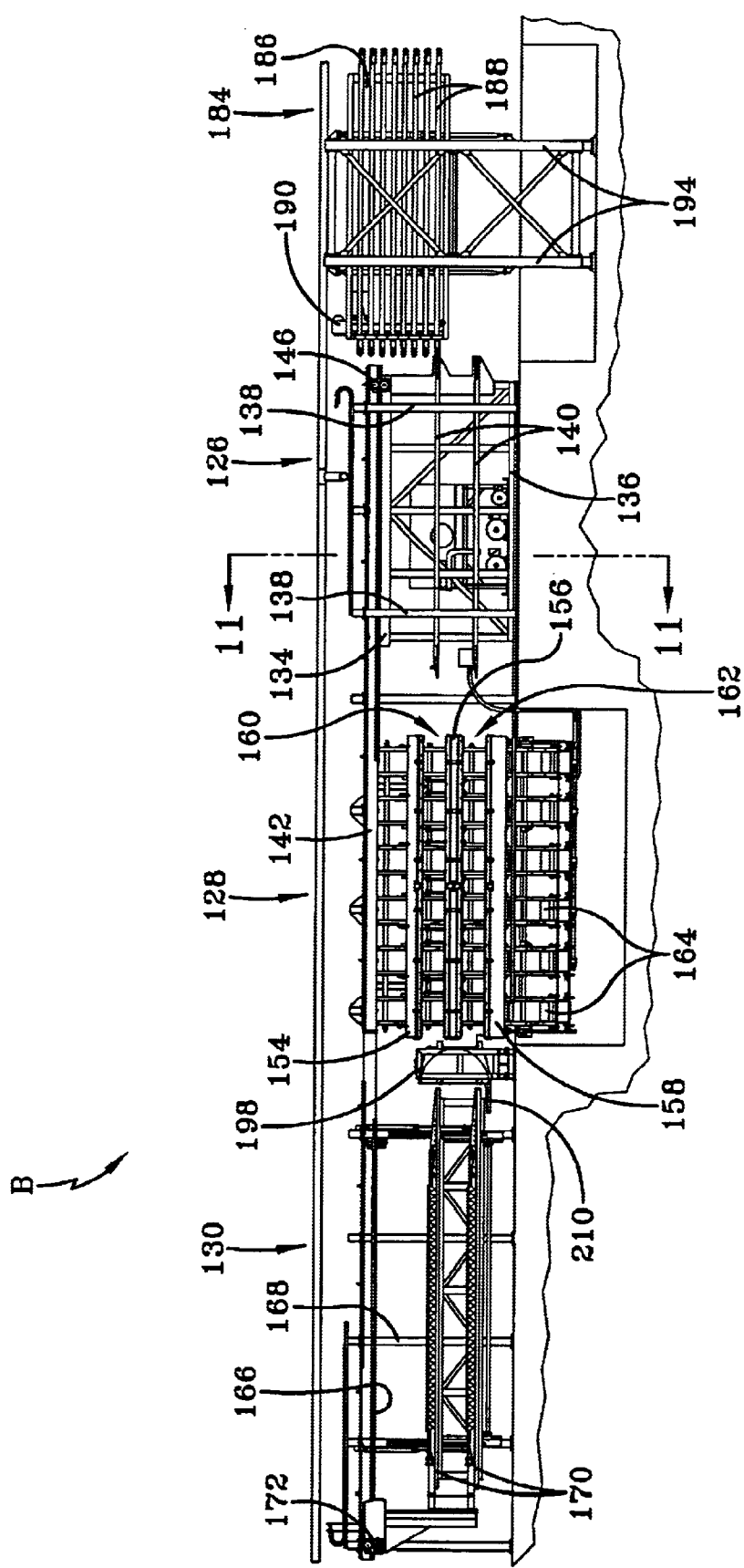
FIG. 2B is a side view of the press cell.
Figure 2C:
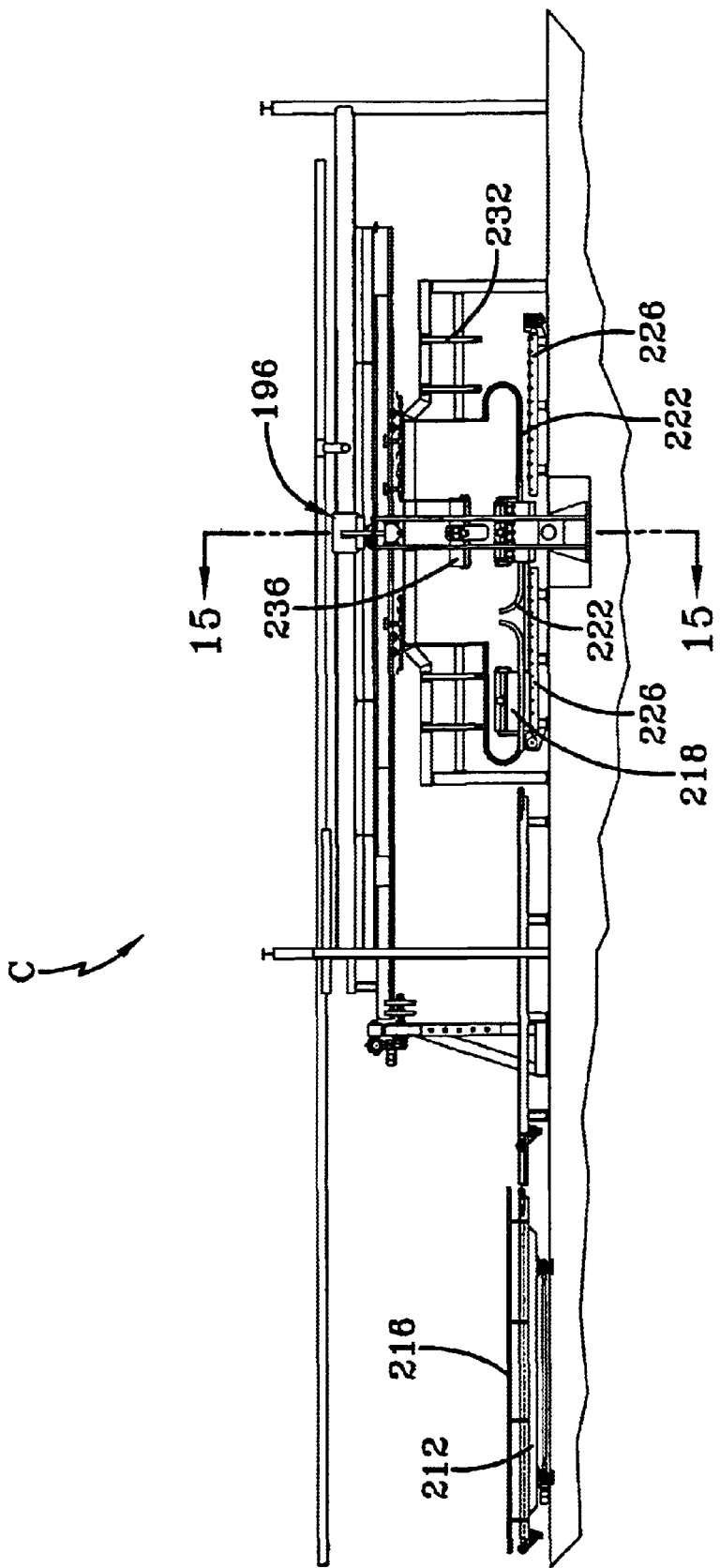
FIG. 2C is a side view of the splice cure press cell.
Figure 12:
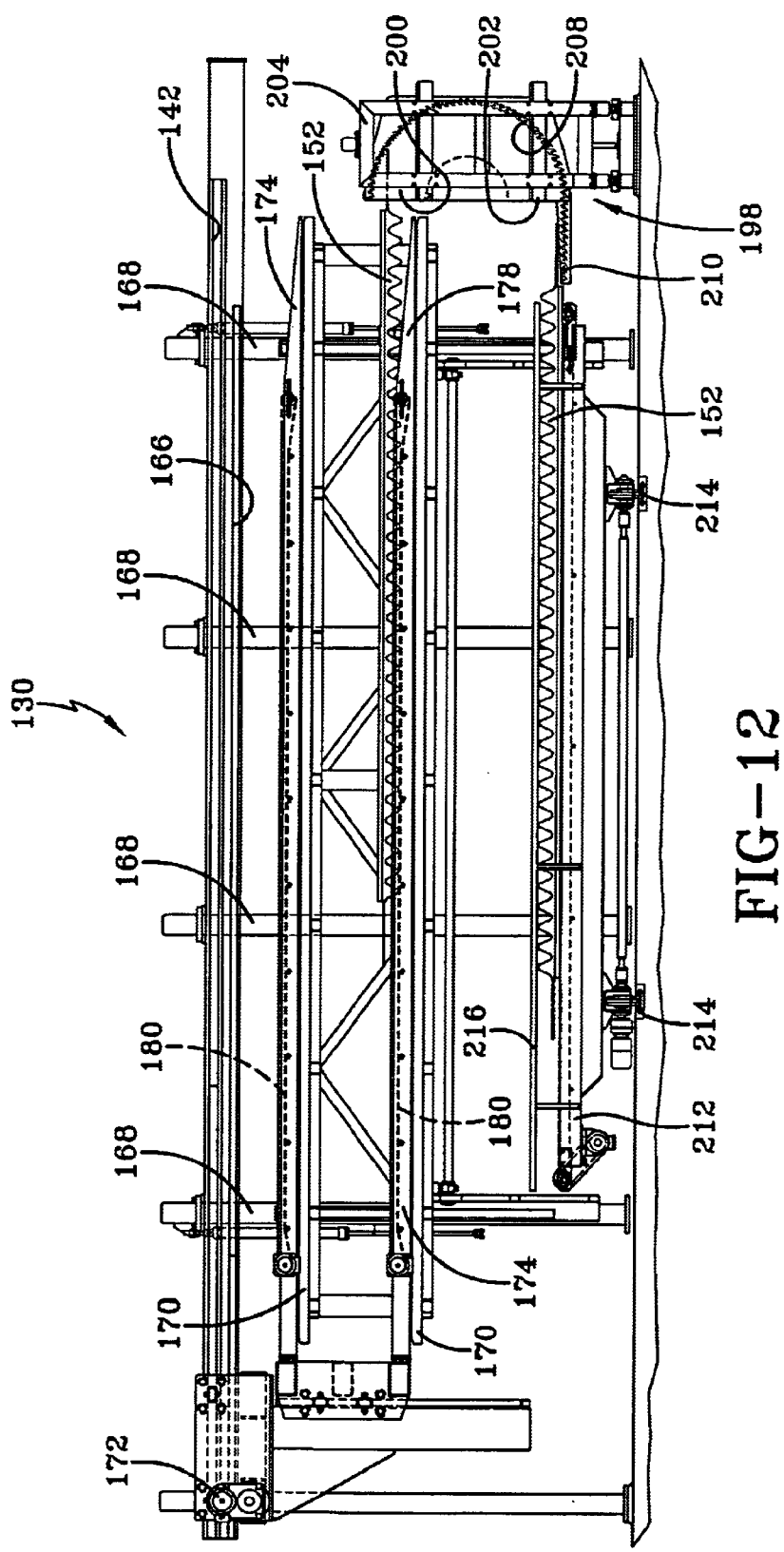
FIG. 12 is the unloader assembly.
Figure 13:
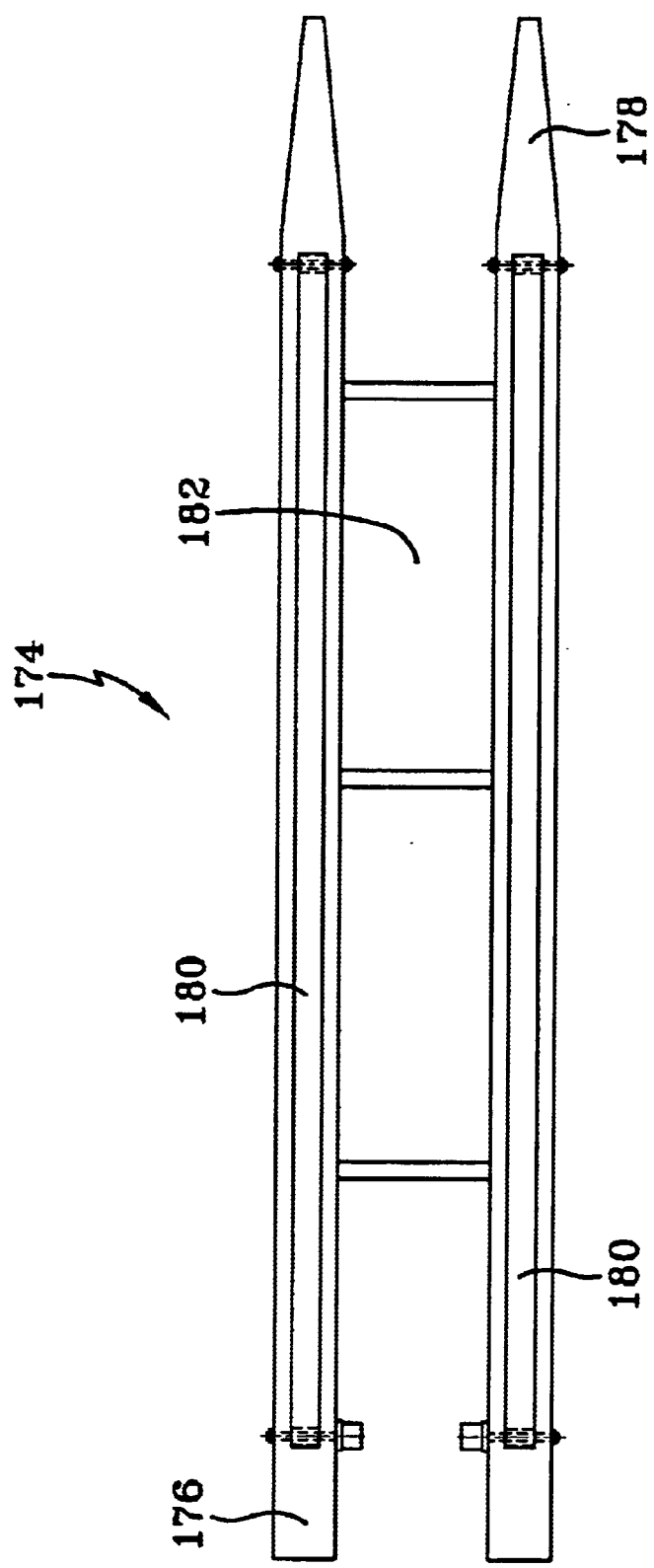
FIG. 13 is the top view of the track removal tool.

At the opposing end of the press 128 from the carcass loading system 126 is the unloader 130, see FIGS. 2B, 12, and 13. The unloader 130 has a top rail 166, vertical support rails 168, and horizontal support rails 170. The top rail 166 is mounted on the overhead rail system 142 that extends along the length of the flat cure press cell B. Movement of the unloader 130 along the overhead rail 142 is powered by a motor 172 located at one end of the unloader 130. The horizontal support rails 170 support at least one track removal tool 174. There are preferably two track removal tools 174, each tool 174 corresponding to a daylight position 160, 162 of the press 128. Additionally, the horizontal support rails 170 travels vertically along the vertical support rails 168.

The track removal tool 174 has two extending spaced tines 176. The leading end 178 of each tine 176 is sloped downward to form a wedge with a leading narrow tip. Within each tine 176 is a powered conveyor belt 180 that rises above the surface of each tine 176. A space 182 is maintained between the two tines 176 of each tool 174. If the lugs formed on the flat vulcanized lugged strip 152 are centrally located on the underside of the lugged strip 152, the lugs will reside between the tines 176 when the strip 152 is removed from the press 128. If the lugs are not centrally located on the strip 152, the lugs may reside on the outersides of the tines 176. The tines 176 are supported by wheels along the length of the tines 176. The wheels roll along the horizontal support rails 170 to move the tools 174 into and out of the press 128. The motor 172 drives the track removal tool 174 along the overhead rail 142. The tines 176 are preferably provided with individual pneumatic motors (not shown) to drive the conveyor belts 180 within the tines 176. The pneumatic motors are linked to the movement of the tines 176, so if the removal tool 174 is halted, movement of the conveyor belts 180 is also halted.

To assist in continuous operation of the manufacturing system, a storage unit 184 may be located between the build cell A and the flat cure press cell B. The storage unit 184 has multiple storage locations 186. The illustrated storage area 184 has eight storage locations 186. Each storage location 186 has a conveyor belt 188 powered by an adjacent motor 190. The storage unit 184 is vertically moveable along a pair of vertical posts 192 so that an individual storage location 186 is horizontally aligned with either the build table 2 or a conveyor belt 144 of the carcass loading system 126.

The flat cure press cell B may also have apparatus to transfer the cured strip 152 from the flat cure press cell B. Adjacent to one end of the unloader 130 is the inverter 198, see FIGS. 1B, 2B, and 12. The inverter 198 has a semi-circular path with an upper opening 200 and a lower opening 202. The inverter 198 has a box frame 204 moveable along a transverse rail 206. Within the inverter 198 is a roll conveyor 208 forming the semi-circular path of the inverter 198. The lowermost edge 210 of the roll conveyor 208 extends past the edge of the box frame 204.

Adjacent to the unloader 198, and moving between the flat cure press cell B and the splice cure cell C is flat bed conveyor 212 is mounted on transverse rails 214. The height of the conveyor 212, as measured from the floor, corresponds to the height of the lowermost edge 210 of the inverter roll conveyor 208. The conveyor 212 may be provided with a hand rail 216 to assist in moving the conveyor 212 between the cells.

Operation of the Flat Cure Press Cell

After an unvulcanized carcass 90 has been built in the build cell A, the carcass 90 is shuttled off the build table 2 and to the flat cure press cell B. If no storage unit 184 is employed between the build cell A and the flat cure press cell B, the uncured carcass 90 is moved onto one of the conveyor belts 144 of the carcass loading system 126.

If a storage unit 184 is employed, the storage unit 184 moves along the vertical posts 194 to align an empty conveyor belt 188 with the build table 2 prior to the carcass 90 being transferred. The build table conveyor belt 10 begins to move in the direction towards the press cell B, and the aligned conveyor belt 188 begins to move in the same direction, pulling the carcass 90 onto the belt 188 in the storage unit 184.

To transfer the carcass 90 into the carcass loading system 126, the storage unit 184 travels along the vertical posts 194 until at least one of the conveyor belts 188 carrying an uncured carcass 90 is aligned with least one of the conveyor belts 144 in the carcass loader 126. The motor 146 of the loading system is engaged, and both belts 144, 188 begin to travel in the same direction, at the same speed, to transfer the carcass 90 from the storage unit 184 to the loader 126. Once the carcass 90 has been completely transferred onto a belt 144 within the loader 126, movement of the belt 144 is stopped.

To place the carcass 90 into the cure press 128, the clutch of the loader frame structure 132 is disengaged and the loader frame structure 132 travels in the direction of the press 128 along the overhead rail system 142. The top belt 144 enters the top daylight position 160 of the press 128 and the bottom belt 144 enters the bottom daylight position 162. The loader frame 132 travels to a preset location at the opposing end of the press daylight positions 160, 162. After the loader frame 132 has reached the preset location, the conveyor belts 144 begin to move in the direction of the unloader 130. As the conveyor belts 144 move, the loader frame structure 132 begins to travel back to its primary position adjacent to the press 128. The speed of the conveyor belts 144 and the loader frame structure 132 are synchronized so that the uncured carcass 90 is evenly laid into the press 128. Prior to loading a carcass 90 into the press 128, if required, unvulcanized lugs are placed into the mold cavities. When the uncured carcass 90 is placed into the press 128, the ends of the carcass extend past the endmost molds and thus will not be cured. The uncured ends will be spliced together and cured in cell C.

After carcasses 90 have been placed in the press 128, the hydraulic cylinder rams 164 and the counterbalance cylinders operate to close the daylight positions 160, 162 of the press 128 and the carcasses 90 are cured. During curing, the endmost mold cavities are cooled with water to reduce the cavity temperature. As previously discussed, this reduces the cavity temperature so that the endmost lugs adhere to the carcass 90 but remain uncured. The carcass is cured in such a manner that the resulting cured central portion has a length of 75 to 95 percent of the total length of the carcass.

After curing, the press 128 is opened and the cured lugged belt strip 152 is removed in the following manner. After the bottom platen 158 and the center platen 156 are lowered, the motor 172 of the unloader 130 is engaged. The unloader 130, if required, moves along the vertical support rails 168 to align the track removal tools 174 with the molds in the bottom and center platens 158, 156. The unloader 130 begins to move along the overhead rail system 142 in the direction of the press 128. The track removal tools 174 enter the top and bottom daylight positions 160, 162 of the press 128. Due to the wedge shaped configuration of the leading edges 178 of the tines 176, the tines 176 are inserted between the vulcanized lugged strip 152 and the top surface of the molds. As the track removal tools 174 enter further into the press daylight positions 160, 162, the lugged strip 152 is pulled out of the cavities. The flat surface portion of the vulcanized lugged strip 152 rests on top of the conveyor belts 180 of each tine 176. To assist in pulling the vulcanized lugged strip 152 out of the mold cavities, the conveyor belts 180 may be driven in a direction opposite of the travel direction of the unloader 130. After the cured strips 152 are completely removed from the mold cavities, movement of the conveyor belts 180 is stopped and the unloader 130 reverses its direction along the overhead rail system 142, returning to its original location.

After the cured strips 152 have been removed from the press 128 and the unloader 130 has returned to its original location, the strips 152 are resting on the track removal tools 174. The inverter 198 is moved to a position aligned with the end of the track removal tools 174. At the same time, a bed conveyor 212 is positioned adjacent to the unloader 130 so that the lowermost edge 210 of the roll conveyor 208 is aligned with the surface of the flat bed conveyor 212. The track removal tool 174 containing the strip 152 to be transferred to the splice station 194 is aligned with the upper opening 200 of the inverter 198.

The motor of the unloader 172 is engaged, and the belts 180 on the tines 176 begin to travel in the direction of the inverter 198. As the cured strip 152 travels off the tines 176, it goes into the upper opening 200, travels through the semi-circular path of the inverter 198, out of the lower opening 202, and onto the flat bed conveyor 212. When the strip 152 is in the unloader 130, any formed lugs on the strip face downward; after the lugged strip 152 goes through the inverter 198, the lugs face upward.

The Splice Cure Press Cell

The splice cure press cell C is the last cell in the manufacturing system. This cell C has at least one splice station 194 and a cure press 196. The cured strip 152 is spliced in the splice station 194 and cured in the cure press 196 to form an endless lugged belt. The splice cure press cell C and its components are illustrated in FIGS. 1C, 2C, 14 and 15.

The splice cure press cell C is the last cell in the manufacturing system. This cell C has at least one splice station 194 and a cure press 196. The cured strip 152 is spliced in the splice station 194 and cured in the cure press 196 to form an endless lugged belt. The splice cure press cell C and its components are illustrated in FIGS. 1C, 2C, 14 and 15.

Figure 1C:
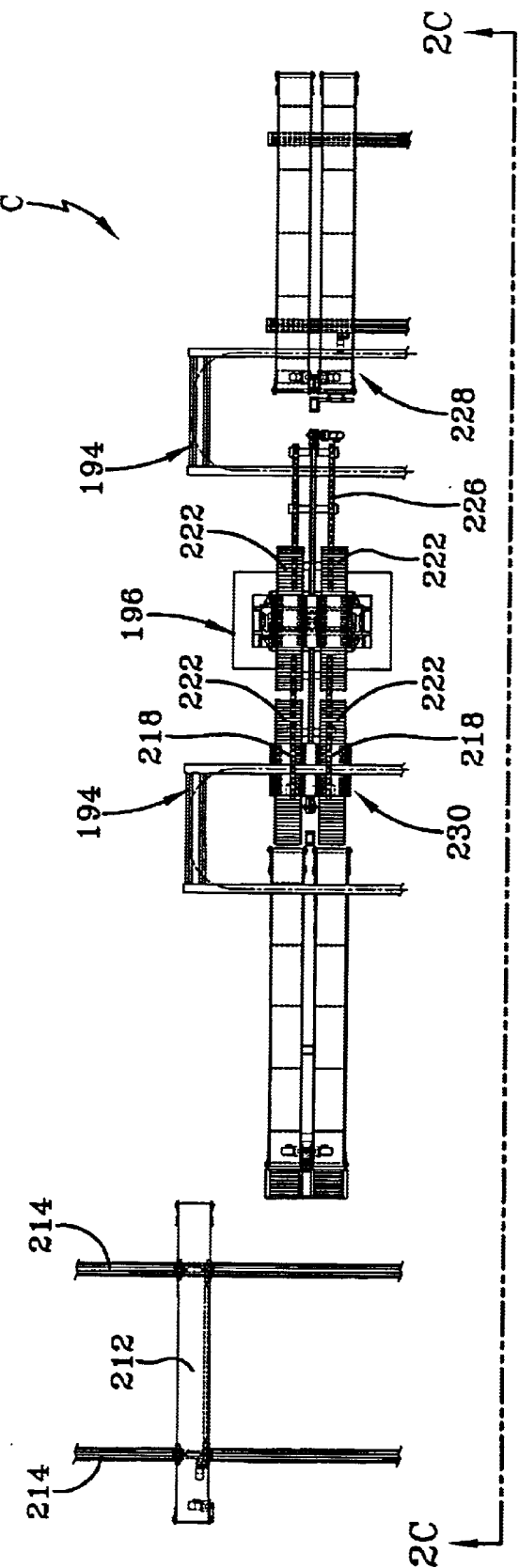
FIG. 1C is an overhead view of the splice cure press cell.
Figure 14:
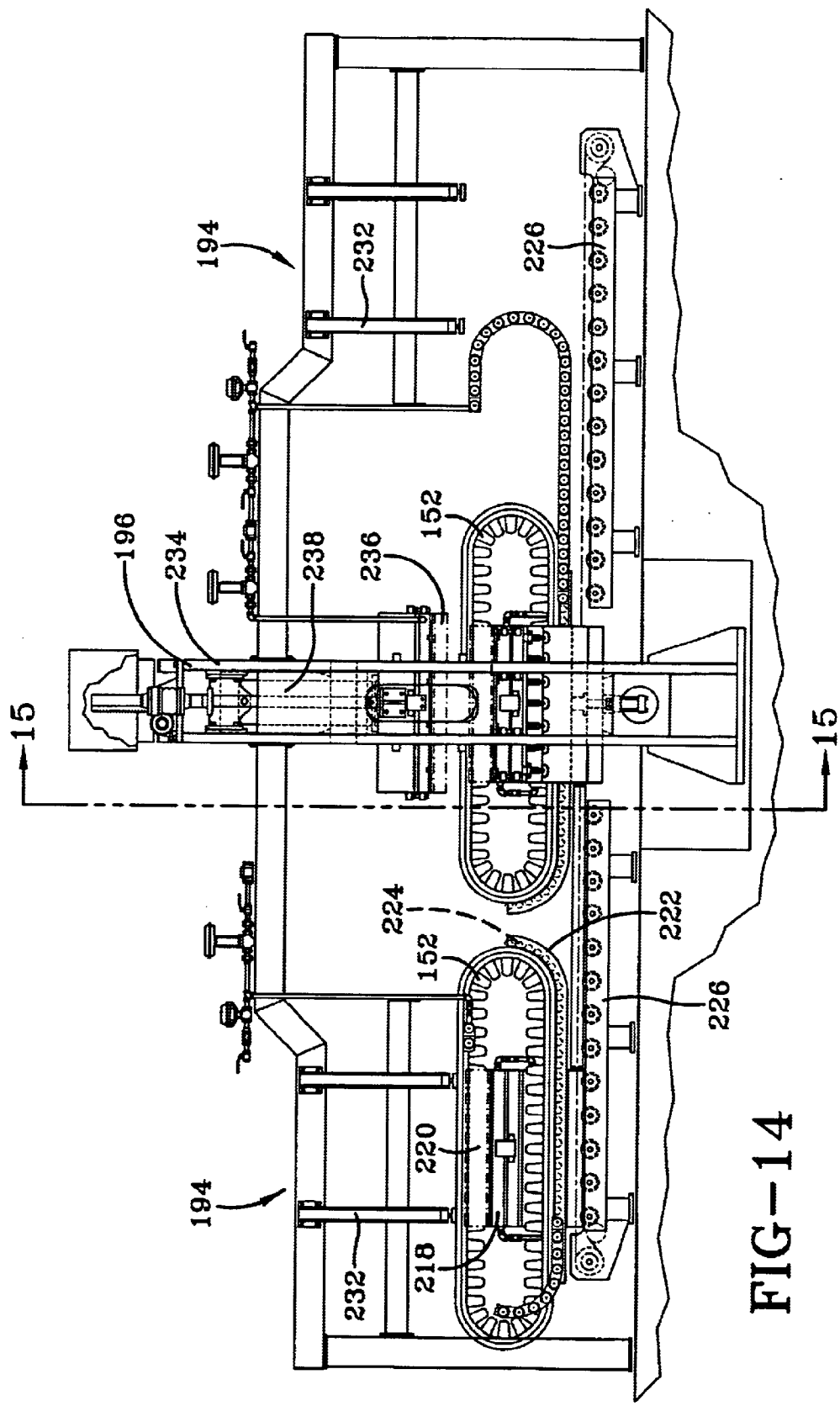
FIG. 14 is the splice cure cell.
Figure 15:
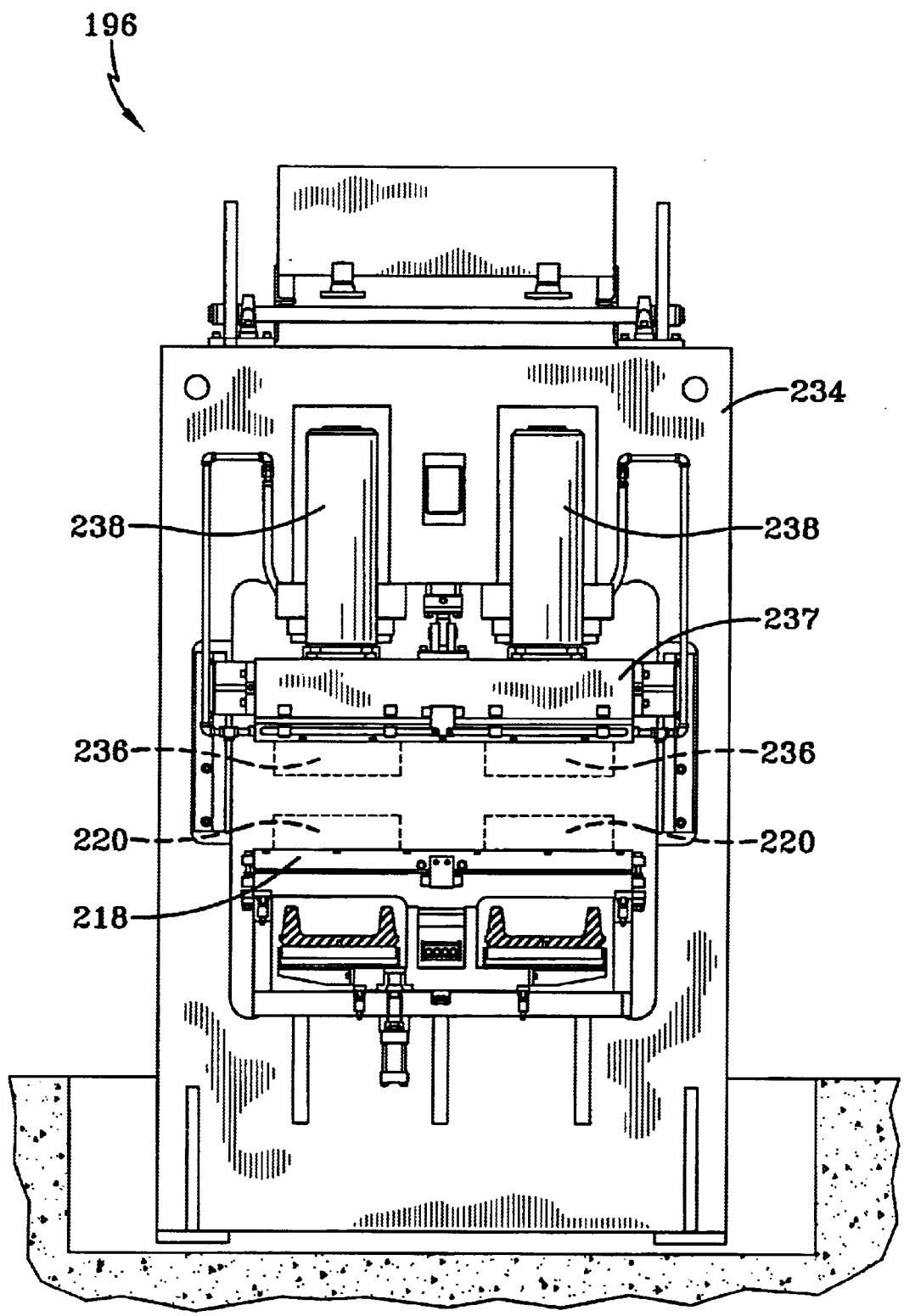
FIG. 15 is the splice cure press along line 15—15 in FIG. 14.

In the illustrated splice cure press cell C, there are splice stations 194 on each side of the press 196, a right hand splice station 228 and a left hand splice station 230, relative to the press 196, and preferably both the right and left hand splice stations 228, 230 each have two bottom platens 218 and associated support conveyors 222, as seen in FIGS. 1C and 14. Each splice station 194 is mounted on one side of a support rail 232, and the bottom platens of a single splice station 194 move in and out of the press 196 together. Alternatively, there may be only a single splice station 194 on each side of the press 196, a single station 194 located only on one side of the press 196, or the two bottom platens 218 located on one side of the press 196 may move independently into and out of the press 196.

The press 196 is housed in a support frame 234. The press 196 has a top platen 237. The top platen 237 is powered by a hydraulic ram 238 mounted over the top platen 237, the hydraulic ram 238 providing the necessary press force. The top platen 237 is heated by steam for curing of the spliced strip 152. In the illustrated press 196, there is one top platens 237, with two mold toolings 236 mounted adjacently for simultaneous curing of two spliced strips 152. In an alternative construction, the press 196 may have a single mold tooling 236 to cure only one spliced strip 152 or the press 196 may have two adjacent platens 237 which may be independently operated.

At each station, apparatus may be provided to remove the cured lugged belt from the splice cure press cell. Such apparatus may be, but is not limited to, overhead lifting devices mounted on overhead rails.

Operation of the Splice Cure Press Cell

After the cured strip 152 has been transferred to the conveyor 212, the conveyor 212 moves over to the end of the splice station 194 and the lugged strip 152 is transferred onto the support roll conveyor 222. The following steps are taken to splice the lugged strip. The operator first loads any necessary unvulcanized lugs into the centermost molds 220 in the bottom platen 218 and then pulls the ends of the lugged strip up over the bottom platen 218, inserting the previously cured lugs just in from the end of the lugged strips into the molds. The ends of the lugged strip are spliced together by overlapping the ends. If necessary, additional material may be added to the splice region or material may be removed from the splice region.

The bottom platen 218 and molds 220 are shuttled into the cure press 196. The top platen 237 closes and the splice is cured. During curing, the unvulcanized lugs are cured and adhered to the splice region. After cure is completed, the bottom platen 218 and molds 220 are shuttled out of the cure press 196. The cured lugged belt is removed from the splice station 194.

During operation of the cell C, when the bottom platen 218 is outside of the cure press 196, cold water travels through at least the molds 220, and if desired or necessary through the platen 218, so that the operator can work around the splice station 194 to either splice the cured lugged strip 152 or to remove the cured lugged belt. When the platen 218 is indexed into the press 196, steam passes through the molds 220 and if desired, through bottom platen 218 as well.

In the illustrated double splice station cell C with a splice station 194 on each side of the press 196, i.e. a right hand and a left hand splice station 228, 230 with a pair of bottom platens 218 at each station 228, 230, the cell C is preferably operated in the following method. After a lugged strip 152 is delivered to the support conveyors 222 at one splice station 194, for example, at the left hand splice station 230, the lugged strip 152 is hand spliced. During this time, the bottom platens 218 of the right hand station 228 are in the press 196 curing a pair of lugged strips 152. After the cure cycle is completed, the steam in the molds 220 within the press 196 is shut off, and cool water begins to flow through the molds 220. Steam continues to flow through the top platen 237 and molds 236. The bottom platens 218, molds 220, and cured belts are indexed out of the press 196. As the bottom platens 218 begin to index out of the press 196, simultaneously, the bottom platens 218, molds 220, and spliced belts from the left hand station 230 begin to index into the press 196 and steam begins to flow through the molds 220. The cured lugged belts are removed from the right hand splice station 228 and new strips 152 are delivered to the splice station. In this manner, the splice cure cell C can continuously operate.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for manipulating a lugged carcass strip, wherein the strip has at least one vulcanized layer and a plurality of lugs protruding from at least one surface of the vulcanized layer, the apparatus comprising a semi-circular tube for inverting the strip and changing the orientation of the lugs relative to the vulcanized layer; further comprising a transverse rail, a box frame being moveably mounted to travel along the transverse rail to transport the semi-circular tube between a first position and a second position proximately disposed to the lugged carcass strip.

2. An apparatus in accordance with claim 1, wherein a conveyor is mounted within the semi-circular tube and includes a lowermost edge that extends past the lower edge of the box frame.

3. An apparatus in accordance with claim 2 wherein the lower edge of the conveyor is aligned to receive the lugged carcass strip with the box frame in the second position.

* * * * *